United States Patent
Chin et al.

(10) Patent No.: US 9,104,619 B2
(45) Date of Patent: Aug. 11, 2015

(54) PERSISTING DATA ACROSS WARM BOOTS

(75) Inventors: Bill Ying Chin, San Jose, CA (US); Ilya Ratner, San Jose, CA (US); Tushar Desai, San Jose, CA (US); Surendranadh Madineni, San Jose, CA (US); William R. Mahoney, Campbell, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 856 days.

(21) Appl. No.: 12/842,945

(22) Filed: Jul. 23, 2010

(65) Prior Publication Data

US 2012/0023319 A1    Jan. 26, 2012

(51) Int. Cl.

| G06F 9/00 | (2006.01) |
| --- | --- |
| G06F 1/24 | (2006.01) |
| G06F 9/24 | (2006.01) |
| G06F 13/00 | (2006.01) |
| G06F 13/28 | (2006.01) |
| G06F 11/14 | (2006.01) |
| G06F 12/00 | (2006.01) |
| G06F 9/44 | (2006.01) |
| G06F 9/445 | (2006.01) |

(52) U.S. Cl.
CPC .............. *G06F 11/1441* (2013.01); *G06F 1/24* (2013.01); *G06F 9/4418* (2013.01); *G06F 12/00* (2013.01); *G06F 9/4401* (2013.01); *G06F 9/445* (2013.01); *G06F 9/4406* (2013.01); *G06F 11/1417* (2013.01)

(58) Field of Classification Search
None
See application file for complete search history.

(56) References Cited

U.S. PATENT DOCUMENTS

| 5,159,592 | A |   | 10/1992 | Perkins |
| --- | --- | --- | --- | --- |
| 5,278,986 | A |   | 1/1994 | Jourdenais et al. |
| 5,410,710 | A |   | 4/1995 | Sarangdhar et al. |
| 5,550,816 | A |   | 8/1996 | Hardwick et al. |
| 5,649,110 | A |   | 7/1997 | Ben-Nun et al. |
| 5,701,502 | A |   | 12/1997 | Baker et al. |
| 5,732,209 | A |   | 3/1998 | Vigil et al. |
| 5,828,578 | A |   | 10/1998 | Blomgren |
| 5,878,232 | A |   | 3/1999 | Marimuthu |
| 5,878,264 | A | * | 3/1999 | Ebrahim .................... 713/323 |
| 5,970,232 | A |   | 10/1999 | Passint et al. |
| 5,978,578 | A |   | 11/1999 | Azarya et al. |
| 6,047,330 | A |   | 4/2000 | Stracke, Jr. |
| 6,097,718 | A |   | 8/2000 | Bion |

(Continued)

FOREIGN PATENT DOCUMENTS

| EP | 0887731 A1 | 12/1998 |
| --- | --- | --- |
| EP | 0926859 A2 | 6/1999 |

(Continued)

OTHER PUBLICATIONS

Intel® Virtualization Technology, Product Brief, "Virtualization 2.0—Moving Beyond Consolidation", 2008, 4 pages.

(Continued)

*Primary Examiner* — Ji H Bae
(74) *Attorney, Agent, or Firm* — Kilpatrick Townsend & Stockton LLP

(57) ABSTRACT

Techniques for persisting data stored in volatile memory across a warm boot. One or more portions (referred to as "warm memory") of volatile memory of the system can be reserved and configured such that the data stored by these portions is not affected by a warm boot thereby resulting in the data stored being persisted across a warm boot.

23 Claims, 9 Drawing Sheets

(56) References Cited

U.S. PATENT DOCUMENTS

| | | | |
|---|---|---|---|
| 6,101,188 A | 8/2000 | Sekine et al. | |
| 6,104,700 A | 8/2000 | Haddock et al. | |
| 6,111,888 A | 8/2000 | Green et al. | |
| 6,115,393 A | 9/2000 | Engel et al. | |
| 6,119,200 A * | 9/2000 | George | 711/106 |
| 6,161,169 A | 12/2000 | Cheng | |
| 6,233,236 B1 | 5/2001 | Nelson et al. | |
| 6,269,391 B1 | 7/2001 | Gillespie | |
| 6,282,678 B1 | 8/2001 | Snay et al. | |
| 6,331,983 B1 | 12/2001 | Haggerty et al. | |
| 6,374,292 B1 | 4/2002 | Srivastava et al. | |
| 6,397,242 B1 | 5/2002 | Devine et al. | |
| 6,424,629 B1 | 7/2002 | Rubino et al. | |
| 6,430,609 B1 | 8/2002 | Dewhurst et al. | |
| 6,496,510 B1 | 12/2002 | Tsukakoshi et al. | |
| 6,496,847 B1 | 12/2002 | Bugnion et al. | |
| 6,567,417 B2 | 5/2003 | Kalkunte et al. | |
| 6,570,875 B1 | 5/2003 | Hegde | |
| 6,577,634 B1 | 6/2003 | Tsukakoshi et al. | |
| 6,580,727 B1 | 6/2003 | Yim et al. | |
| 6,587,469 B1 | 7/2003 | Bragg | |
| 6,597,699 B1 | 7/2003 | Ayres | |
| 6,604,146 B1 | 8/2003 | Rempe et al. | |
| 6,608,819 B1 | 8/2003 | Mitchem et al. | |
| 6,633,916 B2 | 10/2003 | Kauffman | |
| 6,636,895 B1 | 10/2003 | Li et al. | |
| 6,674,756 B1 | 1/2004 | Rao et al. | |
| 6,675,218 B1 | 1/2004 | Mahler et al. | |
| 6,678,248 B1 | 1/2004 | Haddock et al. | |
| 6,680,904 B1 | 1/2004 | Kaplan et al. | |
| 6,691,146 B1 | 2/2004 | Armstrong et al. | |
| 6,704,925 B1 | 3/2004 | Bugnion | |
| 6,711,357 B1 | 3/2004 | Brewer et al. | |
| 6,711,672 B1 | 3/2004 | Agesen | |
| 6,725,289 B1 | 4/2004 | Waldspurger et al. | |
| 6,731,601 B1 | 5/2004 | Krishna et al. | |
| 6,732,220 B2 | 5/2004 | Babaian et al. | |
| 6,763,023 B1 | 7/2004 | Gleeson et al. | |
| 6,785,886 B1 | 8/2004 | Lim et al. | |
| 6,789,156 B1 | 9/2004 | Waldspurger | |
| 6,791,980 B1 | 9/2004 | Li | |
| 6,795,966 B1 | 9/2004 | Lim et al. | |
| 6,847,638 B1 | 1/2005 | Wu | |
| 6,859,438 B2 | 2/2005 | Haddock et al. | |
| 6,879,559 B1 | 4/2005 | Blackmon et al. | |
| 6,880,022 B1 | 4/2005 | Waldspurger et al. | |
| 6,894,970 B1 | 5/2005 | McDermott et al. | |
| 6,898,189 B1 | 5/2005 | Di Benedetto et al. | |
| 6,910,148 B1 | 6/2005 | Ho et al. | |
| 6,938,179 B2 | 8/2005 | Iyer et al. | |
| 6,944,699 B1 | 9/2005 | Bugnion et al. | |
| 6,961,806 B1 | 11/2005 | Agesen et al. | |
| 6,961,941 B1 | 11/2005 | Nelson et al. | |
| 6,975,587 B1 | 12/2005 | Adamski et al. | |
| 6,975,639 B1 | 12/2005 | Hill et al. | |
| 7,039,720 B2 | 5/2006 | Alfieri et al. | |
| 7,058,010 B2 | 6/2006 | Chidambaran et al. | |
| 7,061,858 B1 | 6/2006 | Di Benedetto et al. | |
| 7,065,059 B1 | 6/2006 | Zinin | |
| 7,065,079 B1 | 6/2006 | Patra et al. | |
| 7,080,283 B1 | 7/2006 | Songer et al. | |
| 7,093,160 B2 | 8/2006 | Lau et al. | |
| 7,133,399 B1 | 11/2006 | Brewer et al. | |
| 7,188,237 B2 | 3/2007 | Zhou et al. | |
| 7,194,652 B2 | 3/2007 | Zhou et al. | |
| 7,236,453 B2 | 6/2007 | Visser et al. | |
| 7,269,133 B2 | 9/2007 | Lu et al. | |
| 7,284,236 B2 | 10/2007 | Zhou et al. | |
| 7,292,535 B2 | 11/2007 | Folkes et al. | |
| 7,305,492 B2 | 12/2007 | Bryers et al. | |
| 7,308,503 B2 | 12/2007 | Giraud et al. | |
| 7,315,552 B2 | 1/2008 | Kalkunte et al. | |
| 7,317,722 B2 | 1/2008 | Aquino et al. | |
| 7,324,500 B1 | 1/2008 | Blackmon et al. | |
| 7,327,671 B2 | 2/2008 | Karino et al. | |
| 7,339,903 B2 | 3/2008 | O'Neill | |
| 7,360,084 B1 | 4/2008 | Hardjono | |
| 7,362,700 B2 | 4/2008 | Frick et al. | |
| 7,382,736 B2 | 6/2008 | Mitchem et al. | |
| 7,385,977 B2 | 6/2008 | Wu et al. | |
| 7,392,424 B2 | 6/2008 | Ho et al. | |
| 7,406,037 B2 | 7/2008 | Okita | |
| 7,417,947 B1 | 8/2008 | Marques et al. | |
| 7,417,990 B2 | 8/2008 | Ikeda et al. | |
| 7,418,439 B2 | 8/2008 | Wong | |
| 7,424,014 B2 | 9/2008 | Mattes et al. | |
| 7,441,017 B2 | 10/2008 | Watson et al. | |
| 7,444,422 B1 | 10/2008 | Li | |
| 7,447,225 B2 | 11/2008 | Windisch et al. | |
| 7,483,370 B1 | 1/2009 | Dayal et al. | |
| 7,483,433 B2 | 1/2009 | Simmons et al. | |
| 7,503,039 B2 | 3/2009 | Inoue et al. | |
| 7,518,986 B1 | 4/2009 | Chadalavada et al. | |
| 7,522,521 B2 | 4/2009 | Bettink et al. | |
| 7,533,254 B2 * | 5/2009 | Dybsetter et al. | 713/2 |
| 7,535,826 B1 | 5/2009 | Cole et al. | |
| 7,599,284 B1 | 10/2009 | Di Benedetto et al. | |
| 7,609,617 B2 | 10/2009 | Appanna et al. | |
| 7,613,183 B1 | 11/2009 | Brewer et al. | |
| 7,620,953 B1 | 11/2009 | Tene et al. | |
| 7,652,982 B1 * | 1/2010 | Kovummal | 370/216 |
| 7,656,409 B2 | 2/2010 | Cool et al. | |
| 7,694,298 B2 | 4/2010 | Goud et al. | |
| 7,720,066 B2 | 5/2010 | Weyman et al. | |
| 7,729,296 B1 | 6/2010 | Choudhary | |
| 7,739,360 B2 | 6/2010 | Watson et al. | |
| 7,751,311 B2 | 7/2010 | Ramaiah et al. | |
| 7,787,360 B2 | 8/2010 | Windisch et al. | |
| 7,787,365 B1 | 8/2010 | Marques et al. | |
| 7,788,381 B2 | 8/2010 | Watson et al. | |
| 7,802,073 B1 | 9/2010 | Cheng et al. | |
| 7,804,769 B1 | 9/2010 | Tuplur et al. | |
| 7,804,770 B2 | 9/2010 | Ng | |
| 7,805,516 B2 | 9/2010 | Kettler et al. | |
| 7,830,802 B2 | 11/2010 | Huang et al. | |
| 7,830,895 B2 | 11/2010 | Endo et al. | |
| 7,843,920 B2 | 11/2010 | Karino et al. | |
| 7,843,930 B2 | 11/2010 | Mattes et al. | |
| 7,873,776 B2 | 1/2011 | Hetherington et al. | |
| 7,886,195 B2 | 2/2011 | Mayer | |
| 7,894,334 B2 | 2/2011 | Wen et al. | |
| 7,929,424 B2 | 4/2011 | Kochhar et al. | |
| 7,940,650 B1 | 5/2011 | Sandhir et al. | |
| 7,944,811 B2 | 5/2011 | Windisch et al. | |
| 7,974,315 B2 | 7/2011 | Yan et al. | |
| 8,009,671 B2 | 8/2011 | Guo et al. | |
| 8,014,394 B2 | 9/2011 | Ram | |
| 8,028,290 B2 | 9/2011 | Rymarczyk et al. | |
| 8,040,884 B2 | 10/2011 | Arunachalam et al. | |
| 8,074,110 B2 | 12/2011 | Vera et al. | |
| 8,086,906 B2 | 12/2011 | Ritz et al. | |
| 8,089,964 B2 | 1/2012 | Lo et al. | |
| 8,095,691 B2 | 1/2012 | Verdoorn, Jr. et al. | |
| 8,099,625 B1 | 1/2012 | Tseng et al. | |
| 8,102,848 B1 | 1/2012 | Rao | |
| 8,121,025 B2 | 2/2012 | Duan et al. | |
| 8,131,833 B2 | 3/2012 | Hadas et al. | |
| 8,149,691 B1 | 4/2012 | Chadalavada et al. | |
| 8,156,230 B2 | 4/2012 | Bakke et al. | |
| 8,161,260 B2 | 4/2012 | Srinivasan | |
| 8,180,923 B2 | 5/2012 | Smith et al. | |
| 8,181,174 B2 | 5/2012 | Liu | |
| 8,291,430 B2 | 10/2012 | Anand et al. | |
| 8,335,219 B2 | 12/2012 | Simmons et al. | |
| 8,341,625 B2 | 12/2012 | Ferris et al. | |
| 8,345,536 B1 | 1/2013 | Rao et al. | |
| 8,406,125 B2 | 3/2013 | Dholakia et al. | |
| 8,495,418 B2 | 7/2013 | Abraham et al. | |
| 8,503,289 B2 | 8/2013 | Dholakia et al. | |
| 8,576,703 B2 | 11/2013 | Dholakia et al. | |
| 8,607,110 B1 | 12/2013 | Peng et al. | |
| 8,769,155 B2 | 7/2014 | Nagappan et al. | |
| 8,776,050 B2 | 7/2014 | Plouffe et al. | |
| 2002/0013802 A1 | 1/2002 | Mori et al. | |

(56) References Cited

U.S. PATENT DOCUMENTS

| | | |
|---|---|---|
| 2002/0035641 A1 | 3/2002 | Kurose et al. |
| 2002/0103921 A1 | 8/2002 | Nair et al. |
| 2002/0129166 A1 | 9/2002 | Baxter et al. |
| 2003/0105794 A1 | 6/2003 | Jasinschi et al. |
| 2003/0202520 A1 | 10/2003 | Witkowski et al. |
| 2004/0001485 A1 | 1/2004 | Frick et al. |
| 2004/0030766 A1 | 2/2004 | Witkowski |
| 2004/0078625 A1 | 4/2004 | Rampuria et al. |
| 2005/0028028 A1 | 2/2005 | Jibbe |
| 2005/0036485 A1 | 2/2005 | Eilers et al. |
| 2005/0055598 A1* | 3/2005 | Chen et al. ............ 714/2 |
| 2005/0114846 A1 | 5/2005 | Banks et al. |
| 2005/0213498 A1 | 9/2005 | Appanna et al. |
| 2006/0002343 A1 | 1/2006 | Nain et al. |
| 2006/0004942 A1 | 1/2006 | Hetherington et al. |
| 2006/0018253 A1 | 1/2006 | Windisch et al. |
| 2006/0018333 A1 | 1/2006 | Windisch et al. |
| 2006/0090136 A1 | 4/2006 | Miller et al. |
| 2006/0143617 A1 | 6/2006 | Knauerhase et al. |
| 2006/0171404 A1 | 8/2006 | Nalawade et al. |
| 2006/0176804 A1 | 8/2006 | Shibata |
| 2006/0184938 A1 | 8/2006 | Mangold |
| 2006/0224826 A1 | 10/2006 | Arai et al. |
| 2006/0274649 A1 | 12/2006 | Scholl |
| 2006/0294211 A1 | 12/2006 | Amato |
| 2007/0027976 A1 | 2/2007 | Sasame et al. |
| 2007/0036178 A1 | 2/2007 | Hares et al. |
| 2007/0076594 A1 | 4/2007 | Khan et al. |
| 2007/0162565 A1 | 7/2007 | Hanselmann |
| 2007/0169084 A1* | 7/2007 | Frank et al. ............ 717/168 |
| 2007/0189213 A1 | 8/2007 | Karino et al. |
| 2008/0022410 A1 | 1/2008 | Diehl |
| 2008/0068986 A1 | 3/2008 | Maranhao et al. |
| 2008/0082810 A1* | 4/2008 | Cepulis et al. ............ 713/1 |
| 2008/0120518 A1 | 5/2008 | Ritz et al. |
| 2008/0159325 A1 | 7/2008 | Chen et al. |
| 2008/0165681 A1 | 7/2008 | Huang et al. |
| 2008/0165750 A1 | 7/2008 | Kim |
| 2008/0189468 A1 | 8/2008 | Schmidt et al. |
| 2008/0201603 A1 | 8/2008 | Ritz et al. |
| 2008/0222633 A1 | 9/2008 | Kami |
| 2008/0225859 A1 | 9/2008 | Mitchem et al. |
| 2008/0243773 A1 | 10/2008 | Patel et al. |
| 2008/0244222 A1 | 10/2008 | Supalov et al. |
| 2008/0250266 A1 | 10/2008 | Desai et al. |
| 2009/0028044 A1 | 1/2009 | Windisch et al. |
| 2009/0031166 A1* | 1/2009 | Kathail et al. ............ 714/4 |
| 2009/0036152 A1 | 2/2009 | Janneteau et al. |
| 2009/0049537 A1 | 2/2009 | Chen et al. |
| 2009/0051492 A1 | 2/2009 | Diaz et al. |
| 2009/0054045 A1* | 2/2009 | Zakrzewski et al. ...... 455/418 |
| 2009/0080428 A1 | 3/2009 | Witkowski et al. |
| 2009/0086622 A1 | 4/2009 | Ng |
| 2009/0092135 A1 | 4/2009 | Simmons et al. |
| 2009/0094481 A1 | 4/2009 | Vera et al. |
| 2009/0106409 A1 | 4/2009 | Murata |
| 2009/0198766 A1 | 8/2009 | Chen et al. |
| 2009/0216863 A1 | 8/2009 | Gebhart et al. |
| 2009/0219807 A1 | 9/2009 | Wang |
| 2009/0245248 A1 | 10/2009 | Arberg et al. |
| 2009/0316573 A1 | 12/2009 | Lai |
| 2010/0017643 A1 | 1/2010 | Baba et al. |
| 2010/0039932 A1 | 2/2010 | Wen et al. |
| 2010/0058342 A1 | 3/2010 | Machida |
| 2010/0064293 A1 | 3/2010 | Kang et al. |
| 2010/0107162 A1 | 4/2010 | Edwards et al. |
| 2010/0138208 A1 | 6/2010 | Hattori et al. |
| 2010/0138830 A1 | 6/2010 | Astete et al. |
| 2010/0169253 A1 | 7/2010 | Tan |
| 2010/0235662 A1 | 9/2010 | Nishtala |
| 2010/0257269 A1 | 10/2010 | Clark |
| 2010/0278091 A1 | 11/2010 | Sung et al. |
| 2010/0287548 A1 | 11/2010 | Zhou et al. |
| 2010/0325381 A1 | 12/2010 | Heim |
| 2010/0325485 A1 | 12/2010 | Kamath et al. |
| 2011/0010709 A1 | 1/2011 | Anand et al. |
| 2011/0023028 A1 | 1/2011 | Nandagopal et al. |
| 2011/0072327 A1 | 3/2011 | Schoppmeier et al. |
| 2011/0125949 A1 | 5/2011 | Mudigonda et al. |
| 2011/0126196 A1 | 5/2011 | Cheung et al. |
| 2011/0154331 A1 | 6/2011 | Ciano et al. |
| 2011/0228770 A1 | 9/2011 | Dholakia et al. |
| 2011/0228771 A1 | 9/2011 | Dholakia et al. |
| 2011/0228772 A1 | 9/2011 | Dholakia et al. |
| 2011/0228773 A1 | 9/2011 | Dholakia et al. |
| 2011/0231578 A1 | 9/2011 | Nagappan et al. |
| 2012/0023309 A1 | 1/2012 | Abraham et al. |
| 2012/0030237 A1 | 2/2012 | Tanaka |
| 2012/0158995 A1 | 6/2012 | McNamee et al. |
| 2012/0174097 A1 | 7/2012 | Levin |
| 2012/0230240 A1 | 9/2012 | Nebat et al. |
| 2012/0290869 A1 | 11/2012 | Heitz |
| 2013/0211552 A1 | 8/2013 | Gomez et al. |
| 2013/0259039 A1 | 10/2013 | Dholakia et al. |
| 2014/0007097 A1 | 1/2014 | Chin et al. |
| 2014/0029613 A1 | 1/2014 | Dholakia et al. |
| 2014/0036915 A1 | 2/2014 | Dholakia et al. |
| 2014/0068103 A1 | 3/2014 | Gyambavantha et al. |
| 2014/0089425 A1 | 3/2014 | Chin et al. |
| 2014/0095927 A1 | 4/2014 | Abraham et al. |

FOREIGN PATENT DOCUMENTS

| | | |
|---|---|---|
| EP | 1107511 A2 | 6/2001 |
| EP | 1 939 742 A2 | 2/2008 |
| EP | 2 084 605 A2 | 8/2009 |
| WO | WO 2008/054997 A2 | 5/2008 |
| WO | WO 2014/004312 A1 | 1/2014 |

OTHER PUBLICATIONS

VMware., "Automating High Availability (HA) Services With VMware HA", VMware Infrastructure, Copyright® 1998-2006, 15 pages.

VMware, "Resource Management with Vmware DRS", VMware Infrastructure, Copyright® 1998-2006, 24 pages.

VMware, "Dynamic Balancing and Allocation of Resources for Virtual Machines", Product Datasheet, Copyright® 1998-2006, 2 pages.

Quickspecs, "HP Online VM Migration (for HP Integrity Virtual Machines)", Wordwide—Version 4, Sep. 27, 2010, 4 pages.

VMware, "Live Migration for Virtual Machines Without Service Interruption", Product Datasheet, Copyright® 2009 Vmware, Inc., 4 pages.

Burke, "Vmware Counters Oracle, Microsoft With Free Update", Nov. 13, 2007, 2 pages.

Braden et al., "Integrated Services in the Internet Architecture: an Overview," Jul. 1994, RFC 1633, Network Working Group, pp. 1-28.

"Brocade Serveriron ADX 1000, 4000, and 8000 Series Frequently Asked Questions," pp. 1-10, Copyright 2009, Brocade Communications Systems, Inc.

Chen, "New Paradigm in Application Delivery Networking: Advanced Core Operating System (ACOS) and Multi-CPU Architecture—They Key to Achieving Availability, Scalability and Preformance." White Paper, May 2009, 5 pages, A10 Networks.

Cisco IP Routing Handbook, Copyright 2000, pp. 22-23, Chapter 4, 119-135, and Chapter 9, 405-406, M&T Books.

CISCO Systems, Inc., "BGP Support for Nonstop Routing (NSR) with Stateful Switchover (SSO)." Mar. 20, 2006, pp. 1-18.

CISCO Systems, Inc., "Graceful Restart, Non Stop Routing and IGP routing protocol timer Manipulation," Copyright 2008, pp. 1-4.

CISCO Systems, Inc., "Intermediate System-to-Intermediate System (IS-IS) Support for Graceful Restart (GR) and Non-Stop Routing (NSR)," Copyright 2008, pp. 1-3.

CISCO Systems, Inc., "Internet Protocol Multicast," Internetworking Technologies Handbook, 2000, 3rd Edition, Chapter 43, pp. 43-1 through 43-16.

CISCO Systems, Inc., "Multicast Quick—Start Configuration Guide," Document ID:9356, Copyright 2008-2009, 15 pages.

CISCO Systems, Inc., "Warm Reload," CISCO IOS Releases 12.3(2)T, 12.2(18)S, and 12.2(27)SBC, Copyright 2003, pp. 1-14.

(56) References Cited

OTHER PUBLICATIONS

Demers et al., "Analysis and Simulation of a Fair Queueing Algorithm," Xerox PARC, Copyright 1989, pp. 1-12, ACM.
Fenner, et al., "Protocol Independent Multicast—Sparse Mode (PIM-SM): Protocol Specification (Revised)." Network Working Group, RFC 4601, Aug. 2006, pp. 1-151.
Floyd et al., "Link-sharing and Resource Management Models for Packet Networks," IEEE/ACM Transactions on Networking, Aug. 1995, vol. 3, No. 4, Copyright 1995, IEEE, pp. 1-22.
Freescale Semiconductor, Inc., "Freescale's Embedded Hypervisor for QorIQ™ P4 Series Communications Platform," White Paper, Copyright 2008, 10 pages, Document No. EMHYPQIQTP4CPWP, Rev. 1.
"GIGAswitch FDDI System—Managers Guide," Part No. EK-GGMGA-MG.B01, Jun. 1993 first printing, Apr. 1995 second printing, Copyright 1995, 113 pages, Digital Equipment Corporation, Maynard, MA.
"GIGAswitch System—Managers Guide," Part No. EK-GGMGA-MG.A01, Jun. 1993, Copyright 1993, 237 pages, Digital Equipment Corporation, Maynard, MA.
Hardwick, "IP Multicast Explained," Metaswitch Networks, Jun. 2004, pp. 1-68.
Hemminger, "Delivering Advanced Application Acceleration & Security," Application Delivery Challenge, Jul. 2007, pp. 1-3.
IP Infusion Brochure, "ZebOS® Network Platform: Transporting You to Next Generation Networks," ip infusion™ An ACCESS Company, Jun. 2008, pp. 1-6.
Kaashok et al., "An Efficient Reliable Broadcast Protocol," Operating System Review, Oct. 4, 1989, 15 pages.
Kakadia, et al., "Enterprise Network Design Patterns: High Availability" Sun Microsystems, Inc., Sun BluePrints™ Online, Revision A, Nov. 26, 2003, pp. 1-35, at URL: http://www.sun.com/blueprints.
Kaplan, "Part 3 in the Reliability Series: NSR™ Non-Stop Routing Technology," White Paper, Avici Systems, Copyright 2002, pp. 1-8.
Keshav, "An Engineering Approach to Computer Networking: ATM Networks; the internet, and the Telephone Network," Addison-Wesley Professional Computing Series, part 1 of 5, May 15, 1997, Copyright 1997, pp. 1-129, by AT&T, Addison-Wesley Publishing Company, Reading, Massachusetts.
Keshav, "An Engineering Approach to Computer Networking: ATM Networks; the internet, and the Telephone Network," Addison-Wesley Professional Computing Series, part 2 of 5, May 15, 1997, Copyright 1997, pp. 130-260, by AT&T, Addison-Wesley Publishing Company, Reading, Massachusetts.
Keshav, "An Engineering Approach to Computer Networking: ATM Networks; the internet, and the Telephone Network," Addison-Wesley Professional Computing Series, part 3 of 5, May 15, 1997, Copyright 1997, pp. 261-389, by AT&T, Addison-Wesley Publishing Company, Reading, Massachusetts.
Keshav, "An Engineering Approach to Computer Networking: ATM Networks; the internet, and the Telephone Network," Addison-Wesley Professional Computing Series, part 4 of 5, May 15, 1997, Copyright 1997, pp. 390-519, by AT&T, Addison-Wesley Publishing Company, Reading, Massachusetts.
Keshav, "An Engineering Approach to Computer Networking: ATM Networks; the internet, and the Telephone Network," Addison-Wesley Professional Computing Series, part 5 of 5, May 15, 1997, Copyright 1997, pp. 520-660, by AT&T, Addison-Wesley Publishing Company, Reading, Massachusetts.
Khan, "IP Routing Use Cases," Cisco Press, Sep. 22, 2009, pp. 1-16, at URL: http://www.ciscopress.com/articles/printerfriendly.asp?p=1395746.
Lee, et al., "Open Shortest Path First (OSPF) Conformance and Performance Testing," White Papers, Ixia—Leader in Convergence IP Testing, Copyright 1998-2004, pp. 1-17.
Manolov, et al., "An Investigation into Multicasting, Proceedings of the 14th Annual Workshop on Architecture and System Design," (ProRISC2003), Veldhoven, The Netherlands, Nov. 2003, pp. 523-528.
May, et al., "An Experimental Implementation of Traffic Control for IP Networks," 1993, 11 pages, Sophia-Antipolis Cedex, France.
Moy, "OSPF Version 2," Network Working Group, RFC 2328, Apr. 1998, 204 pages.
Pangal, "Core Based Virtualization—Secure, Elastic and Deterministic Computing is Here . . . ," Blog Posting, May 26, 2009, 1 page, printed on Jul. 13, 2009, at URL: http://community.brocade.com/home/community/brocadeblogs/wingspan/blog/tags/serveri . . . .
Partridge, "A Proposed Flow Specification," RFC 1363, Sep. 1992, pp. 1-20, Network Working Group.
Pepelnjak, et al., "Using Multicast Domains," informIT, Jun. 27, 2003, pp. 1-29, at URL: http://www.informit.com/articles/printerfriendly.aspx?p=32100.
Product Category Brochure, "J Series, M Series and MX Series Routers—Juniper Networks Enterprise Routers—New Levels of Performance, Availability, Advanced Routing Features, and Operations Agility for Today's High-Performance Businesses," Juniper Networks, Nov. 2009, pp. 1-11.
Riggsbee, "From ADC to Web Security, Serving the Online Community," Blog Posting, Jul. 8, 2009, 2 pages, printed on Dec. 22, 2009, at URL: http://community.brocade.com/home/community/brocadeblogs/wingspan/blog/2009/07/0.
Riggsbee, "You've Been Warned, the Revolution Will Not Be Televised," Blog Posting, Jul. 9, 2009, 2 pages, printed on Dec. 22, 2009, at URL: http://community.brocade.com/home/community/brocadeblogs/wingspan/blog/2009/07/0.
Rodbell, "Protocol Independent Multicast—Sparse Mode," CommsDesign, Dec. 19, 2009, pp. 1-5, at URL: http://www.commsdesign.com/main/9811/9811standards.htm.
Schlansker, et al., "High-Performance Ethernet-Based Communications for Future Multi-Core Processors," SC07 Nov. 10-16, 2007, Copyright 2007, 12 pages, ACM.
Brewer, U.S. Appl. No. 09/703,057, filed Oct. 31, 2000. (unpublished application).
Freescale Semiconductor, Inc., "Embedded Multicore: An Introduction," Jul. 2009, Copyright 2009, 73 pages, Document No. EMBMCRM, Rev. 0.
Wright, et al., TCP/IP Illustrated, vol. 2: The Implementation, Copyright 1995, pp. 64, 97, 128,158,186,207,248,277,305,340,383,398,437,476,572,680, 715,756,797,1028, and 1051, Addison-Wesley Publishing Company, Reading, Massachusetts.
Wolf, et al., "Design Issues for High-Performance Active Routers," IEEE Journal on Selected Areas in Communications, IEEE, Inc. New York, USA, Mar. 2001, vol. 19, No. 3, Copyright 2001, IEEE, pp. 404-409.
Order Granting/Denying Request for Ex Parte Reexamination for U.S. Appl. No. 90/010,434, mailed on May 22, 2009, 20 pages.
Order Granting/Denying Request for Ex Parte Reexamination for U.S. Appl. No. 90/010,433, mailed on May 22, 2009, 15 pages.
Order Granting/Denying Request for Ex Parte Reexamination for U.S. Appl. No. 90/010,432, mailed on May 21, 2009, 18 pages.
Non-Final Office Action for U.S. Appl. No. 09/896,228, mailed on Jul. 29, 2005, 17 pages.
Non-Final Office Action for U.S. Appl. No. 09/896,228, mailed on Sep. 7, 2006, 17 pages.
Non-Final Office Action for U.S. Appl. No. 09/896,228, mailed on Mar. 5, 2007, 14 pages.
Final Office Action for U.S. Appl. No. 09/896,228, mailed on Aug. 21, 2007, 15 pages.
Notice of Allowance for U.S. Appl. No. 09/896,228, mailed on Jun. 17, 2008, 20 pages.
Non-Final Office Action for U.S. Appl. No. 09/953,714, mailed on Dec. 21, 2004, 16 pages.
Final Office Action for U.S. Appl. No. 09/953,714, mailed on Jun. 28, 2005, 17 pages.
Non-Final Office Action for U.S. Appl. No. 09/953,714, mailed on Jan. 26, 2006, 15 pages.
Final Office Action for U.S. Appl. No. 09/953,714, mailed on Aug. 17, 2006, 17 pages.
Notice of Allowance for U.S. Appl. No. 09/953,714, mailed on Sep. 14, 2009, 6 pages.

(56) References Cited

OTHER PUBLICATIONS

Notice of Allowance for U.S. Appl. No. 09/953,714, mailed on Feb. 5, 2010, 10 pages.
Non-Final Office Action for U.S. Appl. No. 12/210,957, mailed on Sep. 2, 2009, 16 pages.
Notice of Allowance for U.S. Appl. No. 12/210,957, mailed on Feb. 4, 2010, 10 pages.
Non-Final Office Action for U.S. Appl. No. 12/333,029, mailed on May 27, 2010, 29 pages.
Non-Final Office Action for U.S. Appl. No. 12/333,029, mailed on Mar. 30, 2012, 15 pages.
Non-Final Office Action for U.S. Appl. No. 12/626,432 mailed on Jul. 12, 2012, 13 pages.
Non-Final Office Action for U.S. Appl. No. 12/913,572 mailed on Aug. 3, 2012, 6 pages.
Non-Final Office Action for U.S. Appl. No. 12/823,073 mailed on Aug. 6, 2012, 21 pages.
Notice of Allowance for U.S. Appl. No. 12/333,029 mailed on Aug. 17, 2012, 10 pages.
Non-Final Office Action for U.S. Appl. No. 12/913,598 mailed on Sep. 6, 2012, 10 pages.
Non-Final Office Action for U.S. Appl. No. 12/913,612 mailed on Sep. 19, 2012, 11 pages.
Non-Final Office Action for U.S. Appl. No. 12/913,650 mailed on Oct. 2, 2012, 9 pages.
Notice of Allowance for U.S. Appl. No. 12/913,572 mailed on Nov. 21, 2012, 7 pages.
Non-Final Office Action for U.S. Appl. No. 12/842,936 mailed on Nov. 28, 2012, 12 pages.
Final Office Action for U.S. Appl. No. 12/823,073 mailed on Jan. 23, 2013, 23 pages.
Final Office Action for U.S. Appl. No. 12/626,432 mailed on Apr. 12, 2013, 14 pages.
Notice of Allowance for U.S. Appl. No. 12/913,598 mailed on Mar. 12, 2013, 5 pages.
Notice of Allowance for U.S. Appl. No. 12/913,650 mailed on Mar. 25, 2013, 6 pages.
Notice of Allowance for U.S. Appl. No. 12/842,936 mailed on Apr. 8, 2013, 6 pages.
European Search Report for Application No. EP 02254403, dated Mar. 18, 2003, 3 pages.
European Search Report for Application No. EP 02256444, dated Feb. 23, 2005, 3 pages.
Notice of Allowance for U.S. Appl. No. 12/913,598 mailed on Jul. 9, 2013, 6 pages.
Advisory Action for U.S. Appl. No. 12/626,432 mailed on Sep. 25, 2013, 4 pages.
Non-Final Office Action for U.S. Appl. No. 12/626,432 mailed on Nov. 21, 2013, 9 pages.
Notice of Allowance for U.S. Appl. No. 12/823,073 mailed on Feb. 19, 2014, 8 pages.
Final Office Action for U.S. Appl. No. 12/842,945 mailed on Mar. 7, 2014, 13 pages.
Notice of Allowance for U.S. Appl. No. 13/925,696 mailed on Jan. 7, 2015, 6 pages.
Non-Final Office Action for U.S. Appl. No. 12/626,432 mailed on Jan. 15, 2015, 13 pages.
Non-Final Office Action for U.S. Appl. No. 13/770,751 mailed on Feb. 24, 2015, 10 pages.
Notice of Allowance for U.S. Appl. No. 13/925,723 mailed on Mar. 17, 2015, 5 pages.
Non-Final Office Action for U.S. Appl. No. 13/840,540 mailed on Mar. 23, 2015, 14 pages.
Final Office Action for U.S. Appl. No. 13/796,136 mailed on Mar. 27, 2015, 17 pages.
Notification of Transmittal of the International Search Report and the Written Opinion of the International Searching Authority, or the Declaration; International Search Report and Written Opinion of the International Searching Authority for International Application No. PCT/US2013/047105 mailed on Oct. 29, 2013, 8 pages.
U.S. Appl. No. 14/514,253, filed by Zhou et al. on Oct. 14, 2014.
Final Office Action for U.S. Appl. No. 12/626,432 mailed on Jul. 3, 2014, 12 pages.
Non-Final Office Action for U.S. Appl. No. 13/925,696 mailed on Aug. 27, 2014, 8 pages.
Non-Final Office Action for U.S. Appl. No. 13/796,136 mailed on Sep. 8, 2014, 19 pages.

* cited by examiner

```
/* WM subscriber's private data structure : meta-block */
struct USER_META_DATA {
        unsigned version;
        size_t size;
        void *Lldp_cache_p;
        struct PACKET_LIST *Lldp_pkt_p[SOME_NUMBER];
    } *mb;
```
⎫
⎬ 202
⎭

```
/* Subscriber's WM handle */
WM_HANDLE wmhandle;
```

.
.
.

204 {
```
/*
 * First get the subscriber's WM handle.
 * If subscriber entry does not exists in WM, it creates one.
 */
ret = wm_attach(subscriber, &wmhandle);
```
}

```
if (ret != 0) {
```
206 {
```
    /* Unable to support this subscriber.
     * May be WM subsystem reached its max limit
     */
    return ret;
}
```

208 {
```
/* Now retrieve the subscriber's meta-block */
ret = wm_get_context(wmhandle, &mb);
```

210 {
```
if (mb == NULL) {
    /* This is the Cold boot condition.
     * No prior subscriber data exist in WM. Allocate memory
     * for subscriber meta-block using wm_kmalloc()
     */
    mb = wm_kmalloc(sizeof(struct USER_META_DATA), 0);
    if (mb == NULL) {
        /* Unable to support this subscriber */
        Return ret;
    }

/* Now save the pointer to the subscriber meta-block
     * in to WM subsystem.
     */
    wm_save_context(wmhandle, mb);
}
```

⎧  /* Now access/modify the contents of subscriber's meta-block */
      ⎪  if (mb->Lldp_cache_p  == NULL) {
212  ⎨      /* Create cache for objects, if it is not created before */
      ⎪      mb->Lldp_cache_p  = wm_cache_create("LLDP-cache", 1530);
      ⎩  }

⎧  use(mb);
      ⎪    .
216  ⎨    .
      ⎪    .
      ⎩    .

⎧  /* When subscriber module does not need WM anymore, here is
      ⎪   * the cleanup sequence.
      ⎪   */
      ⎪
      ⎪  /* Free all the objects */
      ⎪  for(I = 0; ; )
      ⎪       wm_cache_free(mb->Lldp_pkt_p[i]);
      ⎪
218  ⎨  /* Free the object cache */
      ⎪  wm_cache_destroy(mb->Lldp_cache_p);
      ⎪
      ⎪  /* Free the meta-block */
      ⎪  wm_kfree(mb);
      ⎪
      ⎪  /* Detach subscriber from WM */
      ⎪  wm_detach(wm_handle);
      ⎩
```

*FIG. 2B*

```
        ┌ typedef struct {                        ← 600
        │       .
        │       .
    602 │       .
        │       } USER_META_BLOCK;
        └ USER_META_BLOCK   *umb;
          WM_HANDLE wmhandle;
          const char subscriber = "asic_driver1";
                  .
                  .
        ┌ /* Attach the subscriber first */
        │ ret = wm_attach(subscriber, &wmhandle);
        │ if (ret != 0) {
    604 │     /* Might have reached max subscribers limit */
        │     return ret;
        └ }

606 ┌ /* Now retrieve the user meta-block */
        └ ret = wm_get_context(wmhandle, &umb);

┌ if (mb == NULL) {
        │     /* Cold boot condition */
    608 │     umb = wm_kmalloc(sizeof(struct USER_META_DATA), 0);
        │     wm_save_context(wmhandle, umb);
        └ }

┌ /* Warm boot, meta-block exists.*/
    610 │
        └ /* Use to meta-block to access persisted data. */
```

*FIG. 6*

PERSISTING DATA ACROSS WARM BOOTS

CROSS-REFERENCES TO RELATED APPLICATIONS

The present application incorporates by reference for all purposes the entire contents of U.S. Non-Provisional Ser. No. 12/842,936 titled ACHIEVING ULTRA-HIGH AVAILABILITY USING A SINGLE CPU, filed Jul. 23, 2010.

BACKGROUND

The present disclosure relates to computer memory and more particularly to techniques that enable data stored in portions of volatile memory to be persisted across warm boots.

A computer system generally comprises volatile memory and non-volatile memory. Non-volatile memory is a storage subsystem that does not lose its stored data when power is removed from the memory. Examples of non-volatile memory include flash memory, ROM, and a disk subsystem. Volatile memory is memory, such as RAM (e.g., DRAM, SRAM), that loses its stored data when power is shut off to the memory. Volatile memory is also sometimes referred to as the computer's main memory. The operating system and its kernel (e.g., Linux, various Windows operating systems, UNIX), which manages the way different programs use the computer's resources (e.g., hardware resources) and regulates the ways that a user controls the computer, is loaded into the volatile memory upon cold (e.g., power-on reset) or warm boot/start of the computer. For applications or processes executed by a processor of the computer system, data related to and used by the applications/processes is also typically stored in volatile memory (e.g., RAM) associated with the volatile memory for more efficient processing. This application or process-related data may include data structures that are used by the application/process.

There are several occasions when a computer system has to be warm (or soft) booted (as opposed to cold or hard boot when power to the computer is cycled). For example, when an application executing on the computer experiences an error from which it cannot recover (e.g., the error causes the application to hang or become unresponsive), a warm boot may need to be performed for recovery of the application. For example, the Control-Alt-Delete key combination may be used on a desktop computer to perform a warm boot.

Traditionally, a warm boot clears all the contents of the volatile memory (RAM) and restarts the operating system without cycling power to the system. As a result of the warm boot, one or more software components (e.g., applications, processes, etc.) that were executed by the computer system prior to the warm boot may also be restarted. Due to the clearing of the volatile memory as a result of the warm boot, all the application or process-related data that was stored in the volatile memory prior to the warm boot is lost. As a result, when a software component such as an application that was executing prior to the warm boot is restarted as a result of the warm boot, the application has to recreate its application-related data in the volatile memory. This process of recreating the data in volatile memory can take a long time, such as several minutes. This downtime adds to the recovery time for the application from the warm boot.

Some systems try to minimize the recovery time after a warm boot by dumping the application or process-related data to non-volatile memory (such as a hard disk or flash) in response to a warm boot signal before continuing with the warm boot. After a warm boot, the application-related data that has been dumped to non-volatile memory is then read back from the non-volatile memory and reloaded into the volatile memory for use by the restarted application. The use of non-volatile memory however adds to the cost of the system. Further, even such a reloading from non-volatile memory can take upwards of 60 seconds since the data structures still have to be built and loaded into the volatile memory. While such a downtime may be acceptable for some applications, it is not acceptable for several processing/data intensive applications such as networking-related applications that are responsible for processing and forwarding data packets being received at very high frequencies. Due to the high frequencies at which packets are received in today's networks, a downtime of even a few seconds can result in a loss of several data packets (many times in the thousands or millions of packets) resulting in loss of data that may not be acceptable.

BRIEF SUMMARY

Embodiments of the present invention provides techniques for persisting data stored in volatile memory across a warm boot. In one embodiment, one or more portions of volatile memory of the system can be reserved and configured such that the data stored by these portions is not affected by a warm boot thereby resulting in the data stored being persisted across a warm boot. The portions of volatile memory that persist data across warm boots may be referred to collectively as warm memory.

In one embodiment, a system is provided comprising a processing element and associated volatile memory. The volatile memory may be configured to comprise a memory section, wherein data stored in the memory section prior to a warm boot is persisted and retrievable after the warm boot.

In one embodiment, techniques are provided that enable volatile memory associated with a processing element to be configured to comprise a memory section (referred to as warm memory) for storing data that is to be persisted across a warm boot. A warm boot may be performed that causes an operating system to be restarted without cycling power to the processing element. The data stored in the memory section prior to the warm boot is persisted and retrievable after the warm boot.

The processing element may be a single processor, a group of processors, a core of a multi-core processor, or a set of cores of a plurality of processors, wherein the set of cores comprises cores from one or more of the plurality of processors.

Different entities, referred to as subscribers, may make use of the warm memory. Subscribers may include but are not restricted to an application, a process, or a thread executed by the processing element, an operating system, a hypervisor, or a device driver.

The warm memory enables storage of data such that data stored in the warm memory prior to a warm boot is retrievable after the warm boot. In one embodiment, a first memory portion of the warm memory may be allocated for a subscriber. This memory portion may be used for storing a metadata block for the subscriber. Data may be stored in the first memory portion. This stored data is persisted across a warm boot. The data stored in the first memory portion is retrievable by the subscriber after the warm boot. In another embodiment, the first memory portion may be used to store a reference to a second memory portion of the warm memory allocated for the subscriber. Data may be stored in the second memory portion. After a warm boot, a subscriber may retrieve the data stored in the second memory portion using the reference information stored in the first memory portion.

The concept of warm memory may be used in various different systems. For example, the concept may be used in a system wherein the memory and processing resources of the system are partitioned into multiple partitions. A program such as a hypervisor may be used for the partitioning and may offer multiple virtual machines to the multiple partitions. The hypervisor may be configured to load operating systems in the multiple partitions. A section of volatile memory allocated to a partition may be set aside as warm memory for the partition. Further, a section of volatile memory may be configured to be shared between multiple partitions. A portion of this shared volatile memory may also be set aside as warm memory. Accordingly, multiple warm memory sections may be set aside, each of which enables data stored in the warm memory section prior to a warm boot to be persisted and retrievable after the warm boot. In one embodiment, the hypervisor may use any of the portions of volatile memory configured as warm memory.

The foregoing, together with other features and embodiments will become more apparent upon referring to the following specification, claims, and accompanying drawings.

BRIEF DESCRIPTION OF THE DRAWINGS

FIGS. 2A and 2B depict a pseudo code sample showing an example of how warm memory APIs may be used according to an embodiment of the present invention;

FIG. 6 depicts an example of a pseudo code snippet showing logical processing for allocating and attaching to a metadata block according to an embodiment of the present invention.

DETAILED DESCRIPTION

In the following description, for the purposes of explanation, specific details are set forth in order to provide a thorough understanding of embodiments of the invention. However, it will be apparent that the invention may be practiced without these specific details.

Embodiments of the present invention provide techniques for persisting data stored in volatile memory across a warm boot. In one embodiment, one or more portions of volatile memory of the system can be reserved and configured such that the data stored by these portions is not affected by a warm boot thereby resulting in the data stored being persisted across a warm boot. The portions of volatile memory that persist data across warm boots may be referred to collectively as warm memory.

For example, an application being executed may store its application-related data (or a portion thereof) in warm memory. Since this portion of memory is not cleared during a warm boot, the application-related information is persisted across a warm boot. When the application is restarted after a warm boot, the application can retrieve the data stored in the warm memory and use it. In this manner, the application-related data does not have to be recreated or loaded from non-volatile memory after a warm boot.

For purposes of this application, any entity that uses warm memory may be referred to as a client or subscriber of the warm memory. Examples of a client or subscriber include but are not restricted to an application, a process, a thread, an operating system (including a component of the operating system such as an operating system kernel module), a device driver executed by a processing element such as a processor, a hypervisor, or any other entity that uses the warm memory. Data related to a subscriber that may be stored in warm memory is referred to as subscriber-related data.

Figure 1:
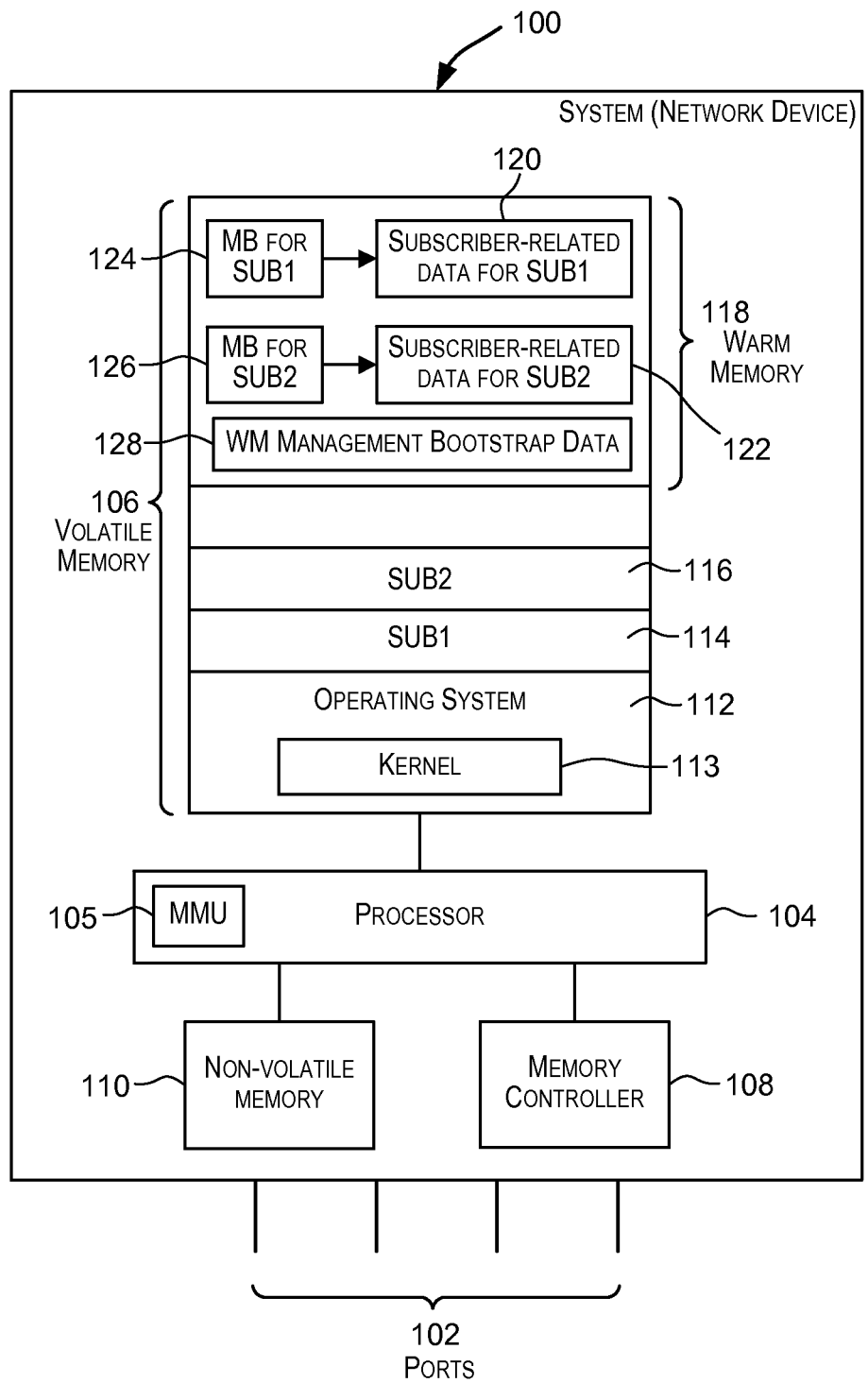
FIG. 1 is a simplified block diagram of a system that may incorporate an embodiment of the present invention.

FIG. 1 is a simplified block diagram of a system 100 that may incorporate an embodiment of the present invention. In FIG. 1, system 100 is embodied as a network device that is configured to forward data. For example, system 100 may be a router or switch provided by Brocade Communications Systems, Inc. In the embodiment depicted in FIG. 1, network device 100 comprises a plurality of ports 102 for receiving and forwarding data packets, a processor 104 for executing applications including data forwarding related applications, a volatile memory (e.g., RAM) 106 associated with processor 104, a memory controller 108, and optionally a non-volatile memory 110.

The embodiment depicted in FIG. 1 is merely an example and is not intended to unduly limit the scope of embodiments of the present invention as recited in the claims. One of ordinary skill in the art would recognize many variations, alternatives, and modifications. For example, although FIG. 1 and its associated description describe a network device, this is not intended to limit the scope of the invention. Teachings described herein are also applicable to other computer systems and devices having a volatile memory associated with a processing element.

Ports 102 represent the I/O plane for network device 100. Network device 100 is configured to receive and forward data using ports 102. A port within ports 102 may be classified as an input port or an output port depending upon whether network device 100 receives or transmits a data packet using the port. A port over which a data packet is received by network device 100 is referred to as an input port. A port used for communicating or forwarding a data packet from network device 100 is referred to as an output port. A particular port may function both as an input port and an output port. A port may be connected by a link or interface to a neighboring network device or network. Ports 102 may be capable of receiving and/or transmitting different types of data traffic at different speeds including 1 Gigabit/sec, 10 Gigabits/sec, or more. In some embodiments, multiple ports of network device 100 may be logically grouped into one or more trunks.

Processor 104 may be configured to execute one or more applications that facilitate forwarding of data packets received by network device 100. Upon receiving a data packet via an input port, network device 100 is configured to determine an output port for the packet for transmitting the data packet from the network device to another neighboring network device or network to facilitate communication of the data packet to its intended destination. Within network device 100, the packet is then forwarded from the input network device to the determined output port and transmitted from network device 100 using the output port. Processor 104 may be configured to execute one or more applications that facilitate one or more data forwarding functions performed by network device 100. Processor 104 may be a general purpose microprocessor such as a PowerPC, Intel, AMD, or ARM microprocessor, operating under the control of software.

Processor 104 may comprise a memory management unit (MMU) 105 that is configured to perform memory management functions such as translation of virtual addresses to physical addresses (i.e., virtual memory management), memory protection, bus arbitration, and the like. Processor 104 may be coupled to a memory controller 108 that is configured to enable memory accesses for processor 104.

Volatile memory 106 is memory, such as RAM (e.g., DRAM, SRAM), that loses its stored data when power is shut off to the memory. Volatile memory 106 associated with processor 104 may store data that is used during runtime by applications executed by processor 104. Volatile memory 106 also stores an image of the operating system and its kernel. For example, upon a cold or warm boot/start, an operating system 112 (including a kernel 113) may be loaded into a portion of volatile memory 106. The operating system may manage the way different programs use the network device's resources (e.g., hardware resources) and regulate the ways that a user controls and interacts with network device 100. Examples of operating systems include but are not limited to various versions of Linux, Windows operating systems, UNIX, and others.

For a subscriber executed by processor 104, the associated subscriber-related data may be stored by volatile memory 106. The subscriber-related data may include code related to the subscriber and data used by the subscriber during execution such as various data structures used by the subscriber, and other data used by the subscriber. For example, if the subscriber is an application, then application-related data may be stored in volatile memory 106. Since processor 104 could execute multiple subscribers, subscriber-related data corresponding to multiple subscribers may be stored in volatile memory 106 at any given point in time. For example, as shown in FIG. 1, volatile memory 106 stores subscriber-related data 114 for a subscriber SUB1. This data may include code and data related to SUB1. Volatile memory 106 may also store subscriber-related data 116 for a subscriber SUB2. The data stored in 116 may include code and data related to SUB2. For example, SUB1 and SUB2 may be applications or processes executed by processor 104.

Although not shown in FIG. 1, volatile memory 106 may also comprise a portion of memory that is shared between multiple subscribers. For example, the shared memory portion may be shared between multiple applications.

Network device 100 may also comprise non-volatile memory 110 for persistent storage of data. Non-volatile memory 110 is a storage subsystem that does not lose its stored data when power is removed from the memory. Examples of non-volatile memory include flash memory, ROM, a disk subsystem, optical media, and the like. For example, program/code/instructions corresponding to applications executed by processor 104 may be stored in non-volatile memory 110.

In one embodiment, network device 100 may comprise multiple subsystems, with each subsystem comprising a processor and associated non-volatile memory as depicted in FIG. 1. For example, in one embodiment, network device 100 may comprise multiple cards that are configured to perform processing to facilitate forwarding of the data packets. The multiple cards may include one or more line cards and one or more management cards. A card, sometimes also referred to as a blade or module, can be inserted into one of a plurality of slots on the chassis of network device 100. This modular design allows for flexible configurations with different combinations of cards in the various slots of the network device according to differing network topologies and switching requirements.

Figure 5:
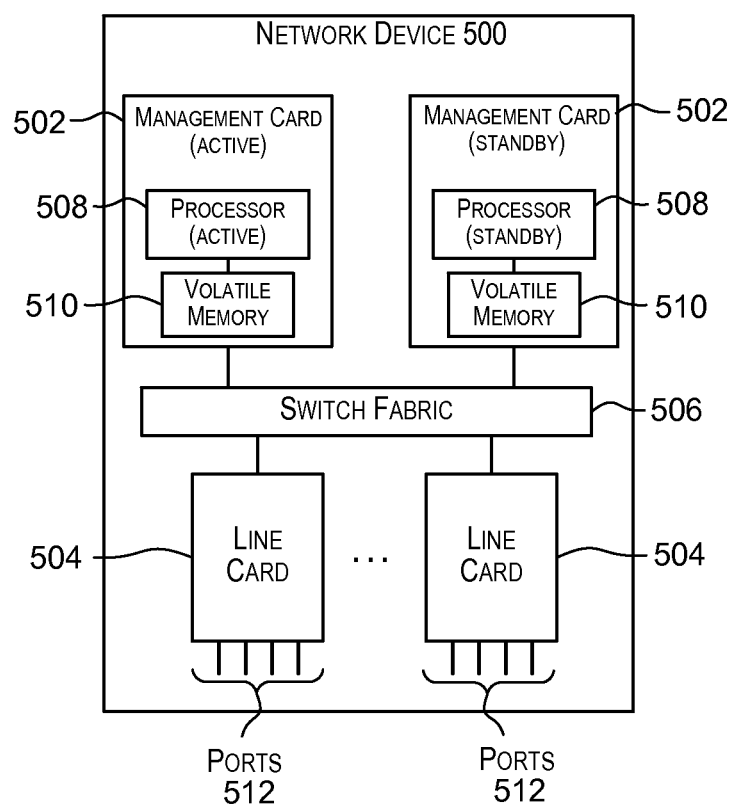
FIG. 5 depicts a simplified block diagram of an embodiment of a network device that may incorporate an embodiment of the present invention.

FIG. 5 depicts a simplified block diagram of an embodiment of a network device 500 that may incorporate an embodiment of the present invention. Network device 500 comprises multiple management cards 502 and line cards 504. Management cards 502 and line cards 504 may communicate with each other via a switch fabric 506. A management card 502 may be configured to perform management and control functions for network device 500 and may represent the management plane for network device 500. A management card may be communicatively coupled to one or more line cards via switch fabric 506 and is responsible for controlling various operations performed by the line cards. A management card 502 may comprise a processor and associated volatile memory as shown in FIG. 1. The processor of a management card may be configured to execute applications for performing management functions such as maintaining routing tables, programming line cards, and the like. If multiple management cards are provided as shown in FIG. 5, one of the management cards may operate as the active management card and the other management card may operate as the standby card. Each management card 502 may comprise a processor 508 and associated volatile memory 510. The volatile memory may be configured to have warm memory as described in this disclosure.

A network device such as network device 100 depicted in FIG. 1 may comprise one or more line cards 504. Each line card 504 may be coupled to one or more ports 512. A line card 504 is configured to receive a packet via a port coupled to the line card and perform processing to forward the packet to an output port of the network device such that the packet can be forwarded to its intended destination. Although not shown in FIG. 5, a line card 504 may comprise a processor and associated volatile memory, which may be configured to have warm memory as described in this disclosure.

The embodiment depicted in FIG. 5 is an example of a network device that may incorporate an embodiment of the present invention. Embodiments of the present invention may also be embodied in network devices of various different configurations.

A power-cycle is a sequence of steps that involves terminating and restarting electric power to a computer system. A power-cycle causes restarting of all hardware components that need electric power for their operation. As a result of the hardware components being restarted, all software components of the system are restarted. A software component can be either program instructions or data. A power-cycle is also referred to as a "cold-boot" (also sometimes referred to as a "cold reboot"). As opposed to a cold boot, a "warm boot" (also sometimes referred to as a "warm reboot") does not involve a power-cycle. A warm boot of a system restarts the operating system without cycling power to the system. A warm boot thus causes the operating system to be reloaded into volatile memory of the system without cycling power to the system. A warm boot may also cause one or more other software components of the system to be started. For example, a subscriber such as an application executed by the system prior to a warm boot may be restarted after the system is warm booted.

Referring back to FIG. 1, in one embodiment, one or more portions of volatile memory 106 may be set aside and configured such that data stored by these one or more portions is not affected by a warm boot thereby persisting the stored data across a warm boot. These portions of volatile memory that enable data to be persisted across a warm boot may be collectively referred to as warm memory. For example, in FIG. 1, section 118 of volatile memory 106 is set aside as warm memory.

There are different ways in which memory portion 118 may be set aside and configured to operate as warm memory. In one embodiment, for a system running the Linux operating system, warm memory support in Linux may be enabled via a conditional compilation variable, WM_VAR. The size of volatile memory that is to be set aside as warm memory 118 may be configured using an Uboot kernel boot parameter, wmem. For example, the following format may be used to configure the warm memory: wmem=<size>k, where "size" is the size of warm memory 118 in K bytes. In this embodiment, when network device 100 boots (either a cold boot or a warm boot), the wmem variable indicates the size of the warm memory. The warm memory capability of the system may be disabled by setting the wmem to zero. In one embodiment, after a boot, network device 100 operates in a warm memory-enabled mode upon detecting that the warm memory size boot parameter (e.g., wmem) is set to a non-zero value.

The size of the warm memory is user-configurable. In one embodiment, 25% of the total available volatile memory 106 may be reserved for warm memory 118. In alternative embodiments, the amount of space reserved for warm memory 118 may depend upon the subscribers executed by the system and the type and size of subscriber-related data to be stored in the warm memory.

While warm memory 118 is shown as a continuous chunk of memory in the embodiment depicted in FIG. 1, in alternative embodiments, discontinuous chunks of volatile memory 106 may be set aside as warm memory 118. Warm memory 118 may be defined by a predefined set of addresses. In one embodiment, warm memory 118 may reside in a special pool of memory managed by the operating system kernel. The operating system kernel modules may allocate portions of the warm memory to requesting subscribers using a special Application Programmer Interface (API) described below.

Various different entities (referred to as subscribers) may make use of warm memory 118. Examples of a client or subscriber include but are not restricted to an application, a process, a thread, an operating system (including a component of the operating system such as an operating system kernel module), a hypervisor, a device driver executed by a processing element such as a processor. For example, a device driver subscriber may store its data in warm memory 118 to enable the data to survive a kernel warm restart. The warm memory may be configured in the application data space of volatile memory 106, in the operating system kernel space (e.g., warm memory pages may be allocated in the kernel memory space), in the other operating system space, or some other space in volatile memory 106.

As shown in FIG. 1, warm memory 118 may store warm memory management bootstrap data 128 that is used for managing warm memory 118. For example, before a subscriber can make use of warm memory 118, it has to register itself. Information related to registered subscribers of the warm memory may be stored in data 128. Data 128 may also comprise other information used for managing the warm memory subsystem 118.

A registered subscriber executed by processor 104 may elect to reserve a portion of warm memory 118 for storing the subscriber-related data or a portion thereof. The subscriber-related data that is stored in warm memory 118 corresponds to data that the subscriber would like to be persisted across a warm boot. For example, subscriber SUB1 may reserve a portion 120 of warm memory 118 for storing its subscriber-related data (or a portion thereof). The subscriber-related data stored in 120 may include one or more data structures used by SUB1, or other subscriber-related data. For example, if SUB1 is an application configured to perform data forwarding, the subscriber-related data stored in warm memory portion 120 may be a routing table that is used by SUB1 for performing the data forwarding functions. Since such routing tables can be quite large and take a long time to create, SUB1 may wish such a table to be persisted across a warm boot so that valuable time does not have to be spent after a warm boot to recreate the routing table or to reload the routing table from non-volatile memory. Since the table is persisted in warm memory, after a warm boot, the restarted application may simply attach to the persisted data and start using it. This reduces the recovery time for the application. Although FIG. 1 depicts a single portion 120 of warm memory 118 being used to store subscriber-related data for subscriber SUB1, in alternative embodiments, SUB1 may reserve multiple portions of warm memory 118 for storing its subscriber-related data or portions thereof. As another example, subscriber SUB2 may store its subscriber-related data (or a portion thereof) in portion 122 of warm memory 118.

In one embodiment, each warm memory subscriber is responsible for keeping track of its data stored in warm memory 118. To accomplish this, a subscriber allocates a special block of warm memory 118 for storing references to subscriber-related data stored in warm memory 118 for the subscriber. This special block of memory is referred to as a meta-data block. The meta-data block for a subscriber may store one or more references to one or more portions of warm memory 118 storing subscriber-related data for that subscriber. A meta-data block for a subscriber may store references to one or more data objects stored by a subscriber within a portion of reserved warm memory. For example, as depicted in FIG. 1, a meta-data block 124 may be allocated for subscriber SUB1 and block 124 may store a reference to warm memory portion 120 storing subscriber-related data for SUB1. Likewise, a meta-data block 126 may be allocated for subscriber SUB2 and may store a reference to portion 122 storing subscriber-related data for SUB2. The meta-data block for a subscriber may also be used by the subscriber to store subscriber-related data. For example, a subscriber may store one or more data objects, such as integers, characters, table entries, etc. in its meta-data block. This data is then persisted across a warm boot. In this manner, the meta-data block itself may be used by a subscriber to store data that is to be persisted across a warm boot.

In one embodiment, a set of special APIs are provided that enable a subscriber to allocate and make use of warm memory 118. A subscriber may allocate a block of warm memory 118 to be used as the subscriber's meta-data block using the wm_kmalloc( ) call (details related to the API calls are provided below). The subscriber then saves the allocated block using the wm_save_context( ) API call. Saving the meta-data block allows the block to be subsequently retrieved using a wm_get_context( ) API call. The wm_get_context( ) API call made by the subscriber returns a pointer to the requesting subscriber to its allocated meta-data block. Once the meta-data block has been accessed, references stored by the meta-data block may then be used by the subscriber to access one or more data objects stored for the subscriber in the warm memory. A meta-data block for a subscriber serves as a top level directory, or a reference guide, which allows the subscriber to gain access to one or more inter-linked warm memory allocated blocks. Warm memory aware subscribers may store at least one reference in their meta-data block in order to bootstrap their warm recovery.

FIG. 6 depicts an example of a pseudo code snippet 600 showing logical processing for allocating and attaching to a meta-data block according to an embodiment of the present invention. Code snippet 600, for example, may be executed after a warm boot by a subscriber that wishes to get a pointer to its meta-data block so that it can access its subscriber-related data stored in warm memory 118 prior to the warm boot.

Section 602 of the code defines a structure for the meta-data block to be used by the subscriber. The subscriber has complete control over the structure and contents of the meta-data block to be used.

The wm_attach( ) call is made in section 604 to obtain a pointer to the subscriber's information that may be stored as part of warm memory management bootstrap data 128. If the subscriber entry already exists in the warm memory subsystem (warm boot case), its handle is returned through the output variable "wmhandle". A subscriber can then use this handle to retrieve its meta-data block. If the subscriber entry does not exist in warm memory (cold boot case), this API may try to allocate a subscriber entry and output its handle through "wmhandle".

In section 606, a wm_get_context( ) API call is made by the subscriber to retrieve the meta-data block for the subscriber. In section 608, a check is made to see if the pointer returned by the wm_get_context( ) call is a NULL pointer. If it is determined not to be a NULL pointer, it indicates that a meta-data block for the subscriber exists and a pointer to that meta-data block is returned. Processing may then continue with section 610 where normal processing of the application occurs. As part of these normal operations, the subscriber may use the information stored by the meta-data block to access subscriber-related data stored and persisted in the warm memory. The meta-data block and its contents are opaque to the memory management subsystem of network device 100. The meta-data block thus provides a mechanism for the subscriber to bootstrap its warm memory usage after a warm boot.

If it is determined in section 608 that the pointer returned by the wm_get_context( ) call is NULL, it indicates that a meta-data block for the subscriber does not exist. This may be because a cold boot has been performed that clears all the contents of volatile memory 106 or the meta-data block has not been previously allocated for the subscriber. In the case of a NULL returned pointer, a portion of warm memory to be used as the subscriber's meta-data block is allocated using the wm_kmalloc( ) API call. The returned memory block is then saved using the wm_save_context( ) API call. Normal processing of the subscriber then continues in section 610.

As indicated above, the meta-data block for a subscriber stores references to subscriber-related data stored for the subscriber in warm memory 118. For example, if a subscriber builds up a linked list in warm memory 118, it may store the head and/or tail of the linked list in its allocated meta-data block so that it can access the linked list after a warm boot. The meta-data block may also contain other information such as a version number and size fields to allow the software to check for compatibility with the current version of the code.

As indicated above, special APIs are provided that enable a subscriber to make use of warm memory 118. The following section describes APIs that may be used by a subscriber of warm memory 118 to perform warm memory-related operations. The APIs described below are merely examples and are not intended to limit the scope of the present invention as recited in the claims. Other APIs are possible in alternative embodiments. A warm memory module may be provided that exports the APIs to subscriber modules/functionalities.

1. int wm_attach(const char*subscriber[in], WM_HANDLE*handle_p)
Description:
This API call allows a subscriber to query and obtain a pointer to its meta-data block in the warm memory. On a cold boot or on a warm boot, this API should be the first call made by a warm memory subscriber. If the subscriber entry already exists in warm memory subsystem (warm boot case), its handle is returned through the output variable "handle_p". Later a subscriber can use this handle to retrieve its meta-data block. If the subscriber entry does not exist in warm memory (cold boot case), this API tries to allocate a subscriber entry and output its handle through "handle_p". The contents of the WM_HANDLE are opaque to the subscriber module. Returns NULL in handle_p if no subscriber entry exists.
Arguments:
const char*subscriber: The name of the subscriber being registered. This name should be unique to the subscriber. In one embodiment, the warm memory subsystem allows a maximum of 31 bytes of subscriber name.
WM_HANDLE*handle_p [OUT]: Pointer to the subscriber handle, which will be filled by the warm memory subsystem upon successful registration.
Return Value:
This API returns 0 on success, an error code on failure. This API fails if warm memory subsystem has no space to accommodate the new subscriber.

2. int wm_detach (WM_HANDLE handle)
Description:
This API allows a subscriber to deregister with the warm memory subsystem. Prior to calling this API, the subscriber is expected to clean up its context specific data structure.
Arguments:
WM_HANDLE handle [IN]: The handle of the subscriber being deregistered.
Return Value:
This API returns 0 on success, error code on failure.

3. int wm_save_context(WM_HANDLE handle[IN], void*mb[IN])
Description:
This API allows a subscriber module to save its private context pointer (pointer to the meta-data block) in warm memory subsystem. (NULL is also accepted). Warm memory subsystem does not interpret the contents of the pointer being saved. If this API is invoked multiple times for the same subscriber, the meta-data block pointer supplied with the last call will be preserved. It is perfectly valid to save the context as NULL. If a subscriber meta-data block size needs to be changed, users are expected to cleanup and free the old meta-block, and then allocate a new meta-block and call wm_save_context( ) with new meta-block pointer.
Arguments:
WM_HANDLE handle [IN]: The handle of the subscriber for which context is being saved.
void*mb [IN]: Pointer of subscriber meta-block
Return Value:
Returns 0 on success, error code on failure.

4. int wm_get_context (WM_HANDLE handle [IN], void**mb_p [OUT])
Description:
This API allows a subscriber module to get (query) its meta-data block pointer from the warm-memory subsystem.
Arguments:
WM_HANDLE handle [IN]: The handle of the subscriber for which context is being saved.
void**mb_p [OUT]: Pointer to the subscriber meta-data block pointer, which is filled by warm memory subsystem.

Return Value:

This API returns 0 on success, error code on failure.

5. void*wm_kmalloc(size_t_size [IN], GFP_T_flags[OUT])

Description:

This API call allocates a block of memory from warm memory. The primary purpose of this API is to allocate memory for a subscriber's meta-data block. This API is identical to the kernel-provided kmalloc, except the memory allocation takes place in warm memory. Some users may also choose this API to allocate memory for their data objects that are to be stored in warm memory, but it is advised to use the more efficient wm_cache_alloc( ) API for subscriber object allocation.

Arguments:

Size_t size [IN]: Size of the warm memory block to be allocated.

GFP_T flags [OUT]: Flags to be used for allocating. These flags are the same as flags used with kmalloc( )

Return Value:

Pointer to the allocated memory block.

6. void wm_kfree(void*mb_p [IN])

Description:

Frees the memory allocated by wm_kmalloc( ).

Arguments:

Void*mb_p [IN]: Pointer to the memory being deleted.

Return Value:

None 7. void*wm_cache_create(const char*cache_name [IN], size_t objsz [IN])

Description:

Create a cache within warm memory, from which objects (e.g., data objects, data structures) of the same size can be allocated. In this context, the cache is a structure in warm memory that enables portions of warm memory to be allocated for storing objects of size objsz. Subscribers may use this API to create separate caches to allocate warm memory for storing different types of their objects. A cache created using this API can be used as needed to allocate warm memory for storing objects of size objsz using the API "wm_cache_alloc( )" (described below).

Arguments:

const char*cache_name [IN]: The name of the cache being created. In one embodiment, a maximum of 32 bytes are allowed.

size_t objsz [IN]: Size (in bytes) of the objects.

Return Value:

On success, this API returns a pointer to the created warm memory cache. It returns NULL on failure. The subscriber module is expected to save this pointer in its meta-data block to use across warm boots.

8. void*wm_cache_alloc(void*cache_p[IN], GFP_T flags [IN])

Description:

This API allocates an object using the warm memory cache created using the wm_cache_create( ) API call. The subscriber module is expected to keep track of all the allocated objects (normally in meta-data block) until they are freed by the subscriber.

Arguments:

Void*cache_p [IN]: Pointer to the warm memory cache from which the object is to be allocated. GFP_T flags [In]: Flags to be used for allocating. These flags are the same as flags used with kmalloc( ).

Return Value:

This API returns a pointer to the warm memory allocated for the object on success. Returns NULL on failure.

9. void wm_cache_free(void*cache_p [In], void*obj [IN])

Description:

This API releases the memory used for storing a specified object to the specified warm memory portion storing the specified object.

Arguments:

void*cache_p [IN]: Pointer to the warm memory portion into which the object is to be released.

void*obj [IN]: Pointer to the object being freed.

Return Value:

None.

10. void wm_cache_destroy(void*cache_p [IN])

Description:

This API deletes the given warm memory cache, which was allocated using the wm_cache_create( ) call. Prior to calling this API, the subscriber module is expected to release all the objects related to the warm memory cache being destroyed.

Arguments:

void*cache_p [IN]: Pointer to the warm memory cache to be destroyed.

Return Value:

None.

11. void*wm_pa(void*va [IN])

Description:

This API returns the physical address of the given warm memory virtual address. It is equivalent to the macro (_pa( ).

Arguments:

void*va [In]: Virtual address of the warm memory.

Return Value:

Physical address of the given virtual address.

12. void*wm_va(void*pa [IN])

Description:

This API returns the virtual address of the given warm memory physical address. It is equivalent to the macro (_va( ).

Arguments:

void*pa [IN]: Physical address of the warm memory.

Return Value:

Virtual address of the given physical address.

FIGS. 2A and 2B depict a pseudo code sample 200 showing an example of how warm memory APIs may be used according to an embodiment of the present invention. The pseudo code is divided into sections to facilitate its explanation. In section 202 of the code, the subscriber defines a structure for the meta-data block it wants to use. As can be seen, the definition of the structure of the meta-data block is up to the subscriber. This provides great flexibility for the subscriber to define a meta-data block to suit the subscriber's needs. For example, a client subscriber may specify a meta-data block structure based upon the type of subscriber-related data that the subscriber wishes to store in the warm memory. The client subscriber thus has freedom as to what it can store in the warm memory.

In section 204, a wm_attach( ) call is made to obtain a pointer to the subscriber's information that may be stored as part of warm memory management bootstrap data 128. If the subscriber entry already exists in the warm memory subsystem (warm boot case), its handle is returned through the output variable "wmhandle". A subscriber can then use this handle to retrieve its meta-data block. In 206, if the subscriber entry does not exist in warm memory (cold boot case), this API may try to allocate a subscriber entry and output its handle through "wmhandle". An error maybe returned if the subscriber entry cannot be accessed or created. This may be, for example, due to the maximum number of subscribers being reached.

In section 208, the subscriber makes a wm_get_context( ) call to attach to its meta-data block in warm memory. If such a meta-data block does not exist, then in section 210, a new meta-data block is allocated (using the wm_kmalloc( ) call) and stored in the warm memory (using the wm_save_context( ) call) for future retrieval and a pointer to the allocated block returned to the subscriber.

In section 212, the subscriber allocates a portion of the warm memory (using wm_cache_create( ) call) to serve as a cache that can be used to allocate warm memory portions for storing subscriber-related data. For a cache being created, the subscriber specifies the size of the objects that can be allocated using the cache. For example, in FIG. 2B, a cache named "LLDP-cache" is created for allocating warm memory for storing objects of size 1530 bytes. If the named cache has been previously created, then a handle to that cache is returned else a new cache is created and returned.

The subscriber may then use the warm memory per section 216. As part of this usage, the subscriber may store data in the warm memory. For example, a subscriber may store data in its meta-data block. Alternatively, the subscriber may allocate portions of warm memory to store data and references to these warm memory portions may be stored in the meta-data block. For example, the subscriber may use a cache allocated using wm_cache_create( ) to allocate portions for storing data objects (using the wm_cache_alloc API). The data objects stored in the warm memory block may be retrieved by the subscriber and used as any other data object/structure.

Section 218 identifies APIs that the subscriber may call to release warm memory portions allocated for the subscriber such as portions for storing the subscriber's meta-data block and portions of warm memory reserved for storing data objects for the subscriber. The wm_cache_free( ) call may be made to release warm memory portions for individual objects that were allocated using wm_cache_alloc( ) API. The wm_cache_destroy( ) call may be made to release warm memory caches. The wm_kfree( ) call may be made to release warm memory allocated using the wm_kmalloc( ) call. Accordingly, the wm_kfree( ) call may be used to release a warm memory allocated for storing the subscriber's meta-data block. The wm_detach( ) call may be made to deregister the subscriber with the warm memory subsystem.

Figure 3A:
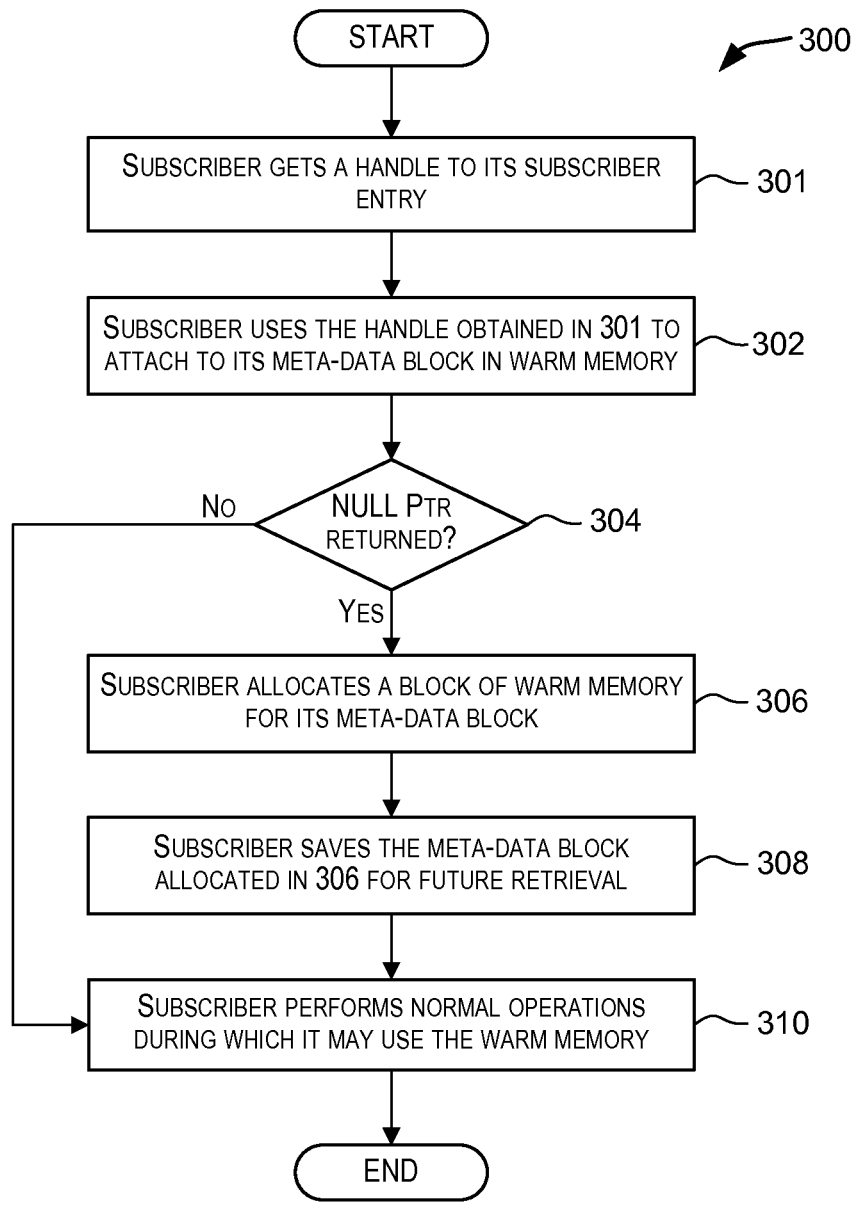
FIGS. 3A and 3B depict a simplified flowchart depicting a method performed for using warm memory according to an embodiment of the present invention.
Figure 3B:
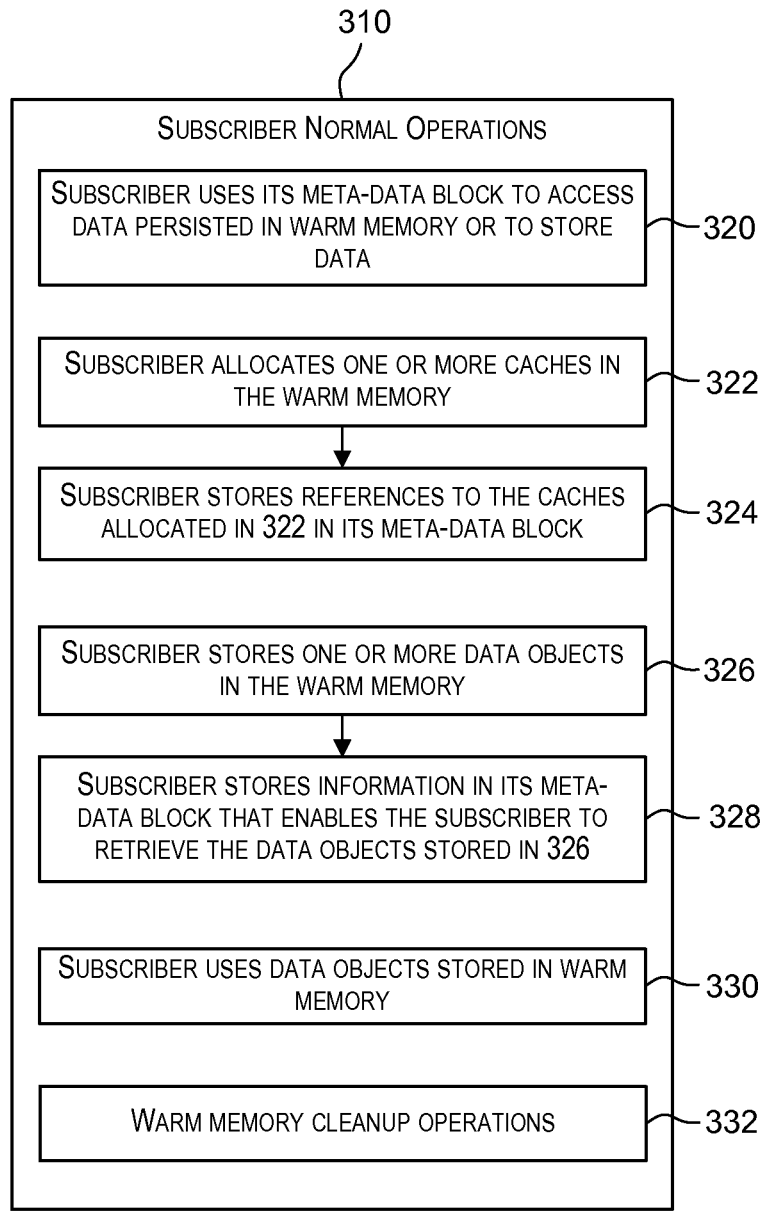

FIGS. 3A and 3B depict a simplified flowchart 300 depicting a method performed for using warm memory according to an embodiment of the present invention. The method depicted in FIG. 3 may be performed when the system is operating in warm memory mode. The method may be embodied in software (e.g., code, program, instructions) executed by processor 104. The software may be stored on a non-transitory computer-readable storage medium such as non-volatile memory 110. The method depicted in FIG. 3 is not intended to limit the scope of the invention as recited in the claims.

As depicted in FIG. 3, in order to use warm memory, a subscriber first gets a handle to its subscriber entry (step 301). In one embodiment, a subscriber has to register with the warm memory subsystem before it can use the warm memory. Upon registration, an entry is created for the registered subscriber and stored by the warm memory subsystem. In one embodiment, the entry maybe stored in warm memory management bootstrap data depicted in FIG. 1. Accordingly, in 301, the subscriber gets a handle to that stored entry. If no entry corresponding to the requesting subscriber is found, then a new entry may be created and a handle to that new entry is returned. An error may be returned if no handle could be obtained; this may happen, for example, when the limit for the number of subscribers that can be serviced by the warm memory has already been reached.

The subscriber then uses the handle obtained in 301 to attach to its meta-data block in warm memory (step 302). A check is then made to see if the API call in 302 returns a NULL pointer (step 304). A return of a NULL pointer indicates that no meta-data block is allocated for the subscriber. Upon determining in 304 that no meta-data block is allocated for the subscriber, the subscriber than allocates a block of warm memory for its meta-data block (step 306). The subscriber then stores the meta-data block allocated in 306 for future retrieval (step 308). The subscriber can then continue with it normal operations after the warm boot (step 310).

If it is determined in 304 that a non-NULL pointer is returned, then this indicates that a meta-data block has been previously allocated for the subscriber. The subscriber can then resume its normal operations (step 320) during which the meta-data block may be used by the subscriber.

Examples of warm memory-related operations that may be performed by a subscriber during normal operation are depicted in FIG. 3B. As part of the subscriber's normal operations and depending upon the subscriber's internal state, the subscriber may decide to use portions of the warm memory. For example, the subscriber may use the meta-data block to access subscriber-related data stored in the warm memory (step 320) and that is persisted across a warm boot. A subscriber may also store subscriber-related data in its meta-data block. This data is then persisted across a warm boot. As previously described, the meta-data block may store pointers or references to one or more data structures/objects stored in warm memory by the subscriber. The subscriber may use this pointer/reference information stored in the meta-data block to access the data structures/objects. For example, a pointer stored in the meta-data block may point to the head of a linked list of nodes stored in warm memory by the subscriber. The subscriber may use this pointer to access the head node of the linked list and then use the pointers between the nodes to access other nodes in the linked list. In this manner, the information stored in the meta-data block may be used to access a data structure stored in the warm memory. Further, internal pointers, if any, of the data objects may be used to access other data objects stored in the warm memory. The internal links in the data structure may be used to traverse the data structure.

A subscriber may allocate one or more caches in the warm memory (step 322). Reference to the allocated warm memory caches may be stored in the subscriber's meta-data block (step 324). This is done so that when the subscriber attaches to the meta-data block, potentially after a warm boot, the information stored in the meta-data block can be used to access the allocated caches. The caches may subsequently be used to allocate warm memory portions to store one or more objects.

The subscriber may store one or more data objects in the warm memory (step 326). The data objects may, for example, store subscriber-related data. For example, a subscriber may store one or more data objects in its meta-data block. As another example, a subscriber may use a cache created by the subscriber in warm memory to allocate portions of warm memory for storing one or more data objects. Accordingly, a subscriber may store subscriber-related data in its meta-data block or in other portions of warm memory allocated by the subscriber.

For the data objects stored in the warm memory, information may be stored in the meta-data block for the subscriber that enables the subscriber to retrieve those data objects from the warm memory (step 328). In one embodiment, an address/ pointer (reference information in general) for each data object stored in the warm memory portion may be stored in the meta-data block. In other situations, the subscriber may store just sufficient information in its meta-data block that enables the subscriber to retrieve the data objects stored in warm memory. For example, if a subscriber stores a linked list in the warm memory, it may store a pointer to the head and/or tail of the linked list in its allocated meta-data block. The subscriber may use this information to access the head and/or tail of the linked list. Internal pointers of the linked list may then be used to traverse the various nodes of the linked list. As can be seen from this linked list example, the subscriber need only store sufficient references data in its meta-data block that enables the subscriber to access warm memory portions allocated for the subscriber and data objects stored in the allocated warm memory portions.

As part of its normal operations, a subscriber may use the one or more data objects stored in warm memory (step 330). The data objects stored in warm memory may be used in a similar manner as data objects stored in other non-warm memory portions.

The subscriber may also perform warm memory cleanup operations (step 332). This may comprise releasing warm memory portions allocated for the subscriber, releasing warm memory used for storing one or more data objects, releasing warm memory allocated for storing the subscriber's meta-data block, or releasing warm memory portions used for storing caches created by the subscriber, or releasing warm memory used for storing the subscriber entry (i.e., deregistering a subscriber). The released warm memory is returned to the available pool of warm memory. The address corresponding to the freed warm memory block is also removed from the meta-data block for the subscriber. The subscriber is in control of when the cleanup operations are performed.

As can be seen from the example in FIG. 3, the subscriber has complete control over how it uses the warm memory. The subscriber has control over the size of portions of the warm memory that are allocated for the subscriber. For example, the subscriber has control over the size of the meta-data block that is allocated for the subscriber and also the warm memory portions caches and their sizes that are allocated from warm memory for the subscriber. Further, what data is stored in the allocated portion(s) is also under the control of the subscriber. A subscriber may store all its subscriber-related data or a portion thereof in the warm memory. The subscriber also has control over how warm memory cleanup operations are performed. The warm memory APIs thus offer a subscriber great flexibility in how the subscriber uses the warm memory.

Further, it is to be noted that a subscriber can allocate memory from warm memory and also from other sections of the volatile memory that are not reserved as warm memory. For allocating/de-allocating warm memory, the subscriber uses warm memory APIs. Other memory-related APIs (e.g., regular kmalloc( ), cache_create( ), cache_allocate( ) calls) may be used for allocation/de-allocation/use of non-warm memory. As described below with respect to FIG. 4, the memory allocators are configured such that they are aware of the warm memory. The memory allocators are configured to only allocate from warm memory when a warm memory API is used, else memory is allocated from other portions of volatile memory. Further, there is no co-mingling of warm and non-warm memory. Upon receiving a call for allocation of memory, the memory allocator determines if the call is a special warm memory call or a regular memory call. For a regular memory call, memory is allocated from the non-warm memory portions. For a warm memory call, memory is allocated from the warm memory.

In the examples described above, warm memory is allocated and then used by a subscriber. In these embodiments, a warm memory block allocated for a subscriber is private to that subscriber and cannot be used by any other subscriber. In alternative embodiments, a warm memory may be shared by multiple subscribers. In this embodiment, the allocation and management of warm memory blocks may be shared between subscribers. In such an embodiment, a single meta-data block may be used by two subscribers. For example, two separate applications may use the same meta-data block. Portions of warm memory may be allocated by either application and both applications can store data objects in the allocated warm memory portions and retrieve data objects from the warm memory portions. In one embodiment, the warm memory that is shared by the two applications may be used for messaging between the applications. In such an embodiment, one application may store data in the warm memory and that data may then be accessed by the other application, potentially after a warm boot.

Figure 4:
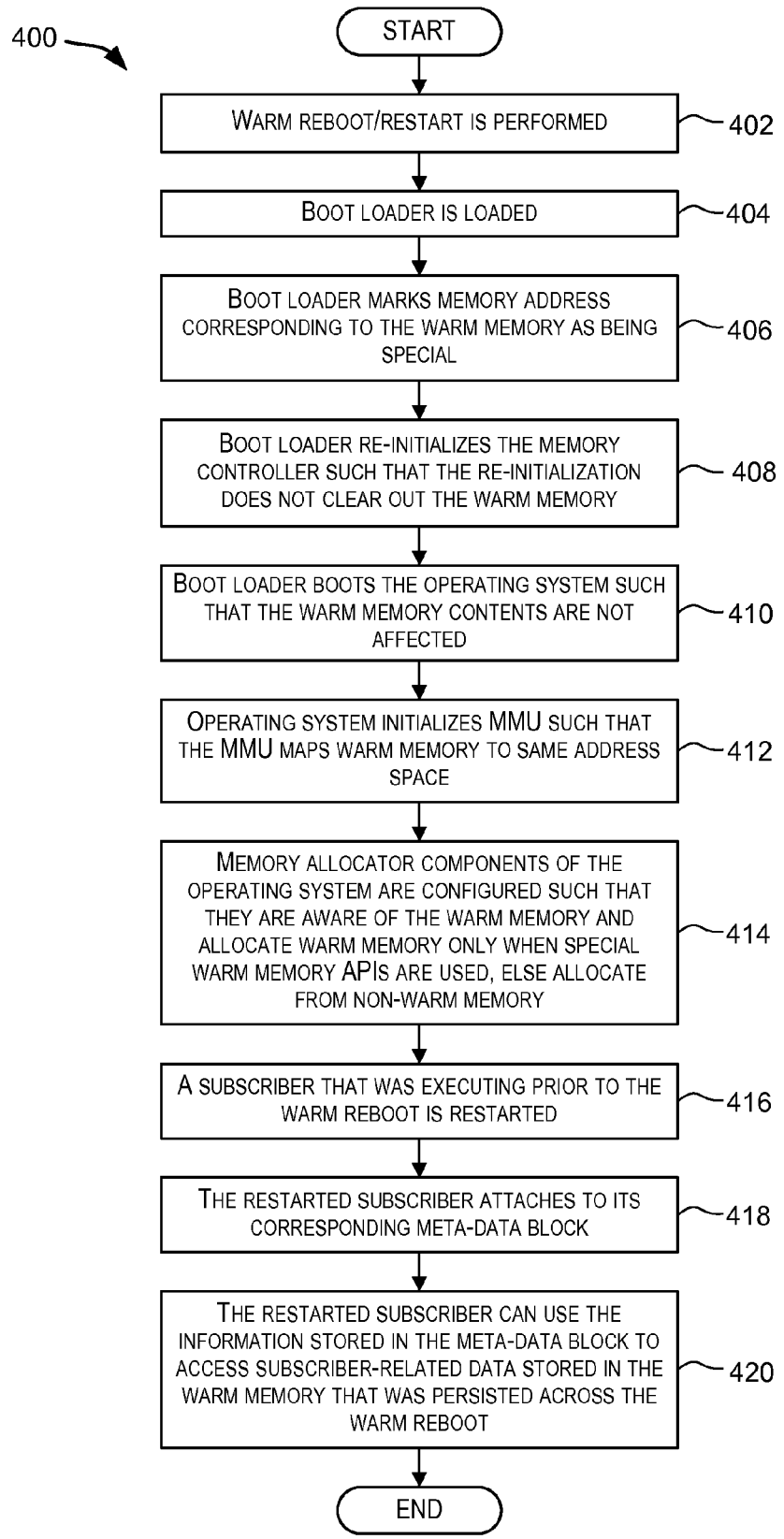
FIG. 4 depicts a simplified flowchart depicting a method performed upon performing a warm boot in warm memory mode according to an embodiment of the present invention.

As described above, the data stored by warm memory is not affected by a warm boot. In other words, the data contents of the warm memory are persisted across a warm boot. In order to achieve this, various memory-management related operations have to be configured such that the warm memory contents are not touched after a warm boot/restart and the operating system is restarted. FIG. 4 depicts a simplified flowchart 400 depicting a method performed upon performing a warm boot in warm memory mode according to an embodiment of the present invention. The method depicted in FIG. 4 may be performed by software (e.g., code, program, instructions) executed by a processor, in hardware, or combinations thereof. The software may be stored on a computer-readable storage medium such as non-volatile memory 110. The method depicted in FIG. 4 is not intended to limit the scope of the invention as recited in the claims.

As depicted in FIG. 4, processing may be initiated when a warm boot/restart is performed (step 402). A boot loader is then loaded (step 404). Various processing steps are then performed to ensure that the contents of the warm memory are not touched during the startup. As part of this processing, the boot loader marks the memory addresses corresponding to the warm memory as being special (step 406). This is so that other components that affect the contents of the volatile memory are notified of the presence of the warm memory. The boot loader is configured to not initialize the warm memory. The boot loader then re-initializes the memory controller such that re-initialization does not clear out the warm memory (step 408). In one embodiment, as part of 408, the DRAM controller is not reset/re-initialized, thus it is applicable to systems without auto-refresh.

The boot loader then boots the operating system (or kernel of the operating system) into the volatile memory (step 410). The operating system is restarted in such a way that the warm memory contents are not affected. The operating system then initialized the MMU such that the MMU maps the warm memory to the same address space as prior to the warm boot (step 412). Accordingly, in 412, the MMU is initialized in such a way as to ensure that warm memory presents itself in the identical fashion, i.e., at the same virtual address, as it was configured before the warm restart.

Memory allocator components of the operating system are configured such that they are aware of the warm memory and are configured to allocate memory from the warm memory only when special warm memory APIs are used (step 414). Else, the allocators are configured to allocate memory from the non-warm memory portions of the volatile memory. In this manner, the memory allocators are configured to allocate warm memory only when directed by the subscriber using the warm memory API. Accordingly, the warm memory allocators (OS memory management components) are initialized to preserve the state of warm memory. This initialization is different for a cold boot versus a warm boot. Presence of warm memory has to be detected by the operating system memory allocator component. In one embodiment, the operating system memory allocator component is modified for this purpose.

A subscriber that was executing prior to the warm boot is then restarted (step 416). The restarted subscriber then attaches to its corresponding meta-data block (step 418). As part of 418, if the meta-data block for the subscriber does not already exist in the warm memory then a new chunk of warm memory may be allocated for the subscriber as its meta-data block (as described above with respect to FIG. 3). The subscriber can use the information stored in the meta-data block to access subscriber-related data stored in the warm memory that was persisted across the warm boot (step 420).

In one embodiment, subscribers are responsible for determining backward compatibility with the data structures residing in warm memory based on the information contained in the meta-data block. Such information may include version, size, etc. and may be stored in the meta-data block.

A subscriber such as a data forwarding application may have stored a routing table in the warm memory prior to the warm boot. That routing table may be accessed by the forwarding application from the warm memory upon restart after a warm boot. Since this routing table is already in the volatile memory associated with the processor, the application does not have to recreate the table, or in instances where data is dumped to non-volatile memory prior to a warm boot, the routing table does not have to be reloaded into the volatile memory from non-volatile memory. The routing table in the warm memory is in the same state as it was prior to the warm boot. As a result, the time to recovery of the application (i.e., the time when the application is up and running at a state the application was executing at prior to the warm boot) from the time of the warm boot is much faster than in conventional systems. The recovery/re-startability time of the application from a warm boot is significantly improved since the application-related data persisted in the warm memory is in the same state as it was prior to the warm boot. The application can immediately attach to this data and start using it.

Accordingly, while conventional techniques can take upwards of 60 seconds for a subscriber to recover from the time of a warm boot, the recovery time for a subscriber according to an embodiment of the present invention can be in milliseconds (msecs) or even less. For example, the recovery time from the time of boot for a subscriber can be less than 10 msecs, less than 20 msecs, less than 50 msecs, less than 100 msecs, and the like. Such recovery times are not achievable using conventional techniques. Further, these recovery times can be achieved without requiring any specialized additional hardware.

Due to the dramatic reduction in recovery times, embodiments of the present invention are particularly useful in computing environments where a quick recovery time is important, such as in a networking environment. For example, a network device such as network device 100 may comprise a management card having a processor and associated volatile memory, a portion of which can be configured as warm memory as described above. For a management card operating in warm memory mode, the quick recovery of subscribers executed by the management card upon a warm boot due to use of the warm memory reduces the downtime of the management card. As a result, management functions performed by the management card can be resumed in a very quick time (e.g., in a matter of milliseconds), thereby reducing the impact of the downtime on network management functions. This may be very beneficial for supporting specialized functionality such as non-stop routing (NASR) related functionality. The warm memory thus provides a mechanism for fast data reclamation by a subscriber across warm boots or restarts.

The ability to persist data across a warm boot, as described above, may be used in various devices and systems. For example, a network device such as network device 500 may have one or more cards that may be configured to provide warm memory capabilities. For example, network device 500 may comprise a line card having a processor and an associated volatile memory, a portion of which can be configured as warm memory as described above. For a line card operating in warm memory mode, the quick recovery of subscribers executed by the line card upon a warm boot as a result of the warm memory reduces the downtime of the line card. As a result, forwarding functions performed by the line card can be resumed in a very quick time (e.g., in a matter of milliseconds), thereby reducing the impact of the downtime on data forwarding performed by the line card.

In the embodiments described above, the volatile memory, a portion of which can be reserved as warm memory, was associated with a processor. This, however, is not intended to limit the scope of embodiments of the present invention. In an alternative embodiment, where the system comprises a multicore processor, the volatile memory, a portion of which can be configured as warm memory, may be associated with a core of the multi-core processor. In yet another embodiment, where the system comprises one or more multi-core processors, the volatile memory, a portion of which can be configured as warm memory, may be associated with a set of one or more cores, where the cores in the set may be from one or more processors. Accordingly, in general, the warm memory-related teachings described herein can be applied to any volatile memory that is associated with a processing element, where the processing element is a processor, a group of processors, or a set of one or more processor cores, where the cores in the set may be from the same or different processors.

Figure 7:
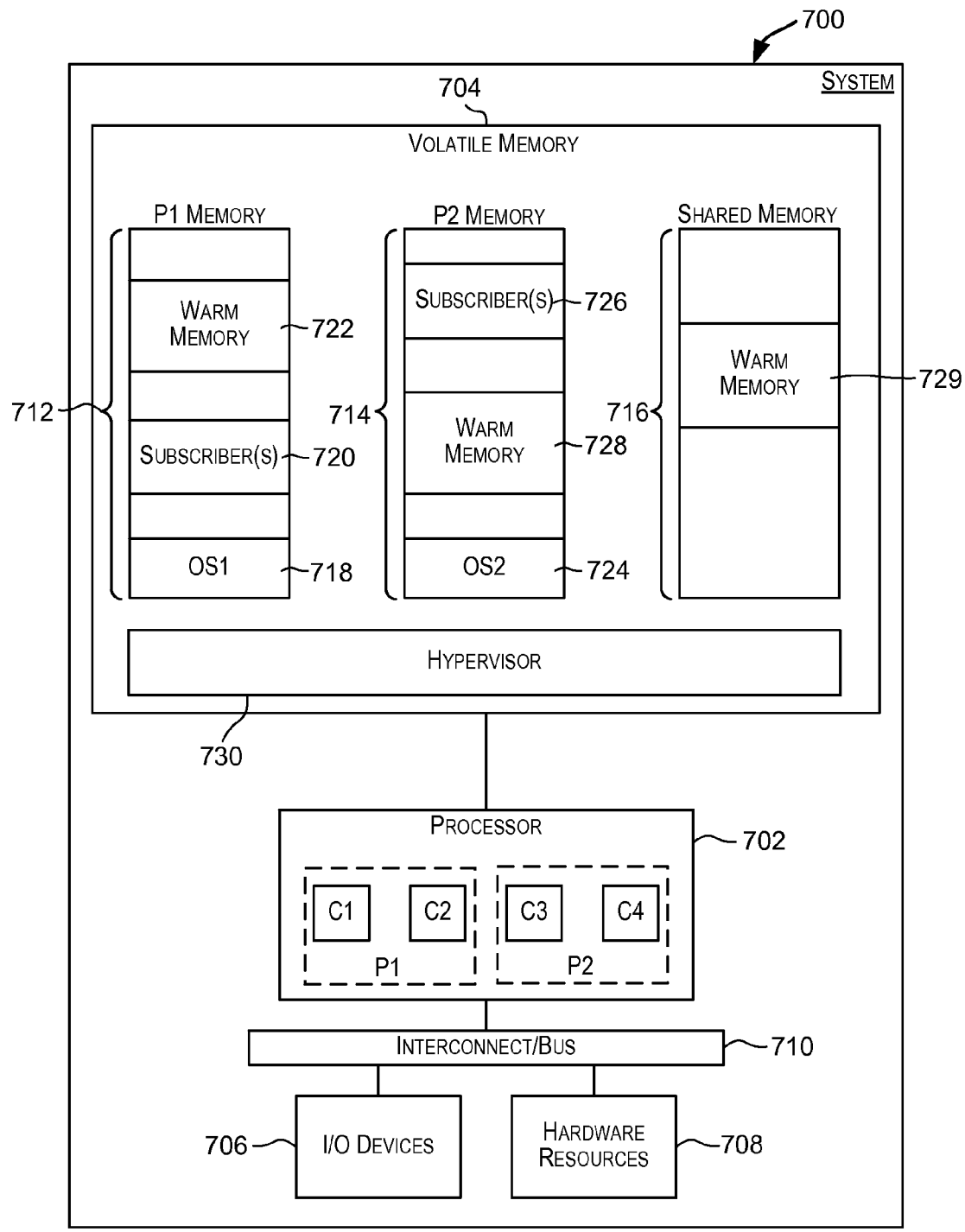
FIG. 7 depicts a simplified block diagram of another system that may incorporate an embodiment of the present invention.

FIG. 7 depicts a simplified block diagram of a system 700 that may incorporate an embodiment of the present invention. System 700 comprises a single physical processor 702 coupled to a volatile memory 704. Processor 702 is also coupled to input/output (I/O) devices 706 and to other hardware resources 708 via an interconnect/bus 710. System 700 depicted in FIG. 7 is merely an example and is not intended to unduly limit the scope of embodiments of the present invention as recited in the claims. One of ordinary skill in the art would recognize many variations, alternatives, and modifications. System 700 may be a network device such as a switch or router provided by Brocade Communications Systems, Inc. The network device may be configured to receive and forward packets.

Physical processor 702 represents the processing resources of system 700. In one embodiment, processor 702 is a multi-core processor comprising a plurality of processing cores. For example, in the embodiment depicted in FIG. 1, processor 702 comprises four cores: C1, C2, C3, and C4. Examples of a multi-core processor include but are not limited to various multi-core processors provided by Freescale Semiconductor, Inc., such as the QorIQ and the PowerQUICC lines of processors provided by Freescale, and others.

Volatile memory 704 represents the memory resources available to physical processor 702. Information related to runtime processing performed by processor 702 may be stored in memory 704. Memory 704 may be a RAM (e.g., SDR RAM, DDR RAM) and is sometimes referred to as the system's main memory.

Hardware resources of system 700 may include I/O devices 706 and other hardware resources 708. I/O devices 706 may include devices such as Ethernet devices, PCIe devices, eLBC devices, ports, and others. Interconnect 710 may include one or more interconnects or buses.

In one embodiment, the processing, memory, and hardware resources of system 700 may be partitioned into one or more logical partitions (referred to herein as partitions). For example, in the embodiment depicted in FIG. 7, the processing resources provided by system 700, namely the multiple cores of processor 702, are partitioned into two logical partitions P1 and P2, with cores C1 and C2 being allocated or assigned to partition P1 and cores C3 and C4 being allocated or assigned to partition P2.

The memory resources provided by memory 704 may also be partitioned and allocated to the different partitions. For example, as depicted in FIG. 7, memory portion 712 of volatile memory 704 is allocated to partition P1 and memory portion 714 is allocated to partition P2. In this manner, each partition has its own secure and private memory area that is accessible only to that partition. A portion of memory 704 may also be configured to be shared between partitions. For example, memory portion 716 is configured to be shared between partitions P1 and P2 (and also by hypervisor 730). This shared memory may be used for multiple purposes including messaging between the two partitions.

The volatile memory assigned to a partition may store, during runtime, an operating system for the partition and data related to one or more subscribers executed by the partition. For example, in the embodiment depicted in FIG. 7, memory 712 allocated to partition P1 comprises a section 718 storing an operating system OS1 for P1 and also comprises a section 720 storing code and data related to one or more subscribers executed by partition P1. A portion of volatile memory 712 may be set aside as warm memory 722. Data stored in warm memory 722 is persisted across warm boots as described above. Volatile memory 714 allocated to partition P2 may comprise a section 724 storing an operating system OS2 operating on P2, a section 726 storing code and data related to one or more subscribers executed by partition P2. A section 728 of volatile memory 714 may be set aside as warm memory to store data that is to be persisted across a warm boot of that partition.

Shared memory 716 may be shared by different partitions and also by hypervisor 730. Shared memory 716 may be shared by subscribers from the same partition or by subscribers from different partitions. A portion 729 of shared memory 716 may be set aside as warm memory. In one embodiment, shared memory 716 may be used for messaging between the sharers. Hypervisor 730 (explained below) may also use shared memory 716. Warm memory 729 may be shared between multiple subscribers, including applications/processes/threads executed by one or more partitions, different operating systems and their components, and the hypervisor.

The hardware resources of system 700, including I/O devices 706 and other hardware resources 708, may also be partitioned between partitions P1 and P2. A hardware resource may be assigned exclusively to one partition or alternatively may be shared between multiple partitions. For example, in one embodiment, a private Ethernet interface may be assigned to each partition, while access to PCIe may be shared between the partitions.

Hypervisor 730 is a software program that facilitates secure partitioning of resources between the partitions of system 700 and management of the partitions. Hypervisor 130 enables multiple operating systems to run concurrently on system 700. Hypervisor 730 presents a virtual machine to each partition and allocates resources between the partitions. For example, the allocation of memory, processing, and hardware resources, as described above, may be facilitated by hypervisor 730. In one embodiment, hypervisor 130 may run directly on processor 702 as an operating system control.

Hypervisor 730 may present a virtual machine to each partition. For example, a virtual machine VM1 may be presented to partition P1 and a virtual machine VM2 may be presented to partition P2. Hypervisor 730 may manage multiple operating systems executed by the partitions. Hypervisor 730 may also facilitate the management of various warm memory portions (e.g., warm memory portions 722, 728, and 729) set aside in volatile memory 704.

Each virtual machine for a partition may operate independently of the other partitions and may not even know that the other partitions exist. The operating system executed for one partition may be the same as or different from the operating system for another partition. For example, in FIG. 7, operating system OS1 of P1 may be the same as OS2 of P2, OS1 may be a completely different operating system than OS2 (e.g., OS1 may be Linux while OS2 may be Windows), or OS1 and OS2 may be different instances or versions of the same operating system (e.g., OS1 may be LinuxV1 while OS2 may be LinuxV2). Operating systems for the partitions are also commonly referred to as guest operating systems. In this manner, each virtual machine or partition can be operated as an independent virtual system.

As described above, volatile memory 704 may be partitioned between partitions managed by hypervisor 730. For example, volatile memory section 712 is allocated for partition P1, section 714 is allocated to partition P2, and section 716 is shared between the partitions. A section of volatile memory allocated to a partition or shared between partitions may be set aside as warm memory. For example, in FIG. 7, a portion 722 of volatile memory section 712 is set aside as warm memory, a portion 728 of volatile memory section 714 is set aside as warm memory, and a portion 729 of shared memory section 716 is set aside as warm memory. All the instances of warm memory depicted in FIG. 7 enable data stored by the warm memories to be persisted across a warm boot.

The warm memory portions depicted in FIG. 7 may be individually configured and managed. In one embodiment, for a warm memory configured for a partition, only subscribers related to that partition and the hypervisor are allowed to use that warm memory section. For example, only subscribers for P1 and hypervisor 730 can use warm memory 722. For warm memory, such as warm memory 729 in shared memory 716, that is shared between multiple partitions, subscribers from one or different partitions and the hypervisor may use the warm memory. Hypervisor 730 can accordingly use warm memories 722, 728, or 729.

In the context of a system providing multiple partitions, each running a virtual machine, a warm boot may be a warm boot of the partition or a warm boot of the entire system. When a partition is warm booted, the operating system for that partition is restarted without cycling power to the system. When the system is warm booted, the operating systems for all the partitions provided by the system may be restarted without cycling power to the system.

In one embodiment, one partition of system 700 may be configured to operate in active mode while another partition operates in standby mode. Conceptually, when operating in active mode the active partition performs a set of functions related to system 700 that are not performed by the standby partition. When a failover occurs, the standby partition becomes the active partition and takes over performance of the set of functions related to system 700 that were previously performed by the partition that was previously active. As a result, the set of functions related to the system continue to be performed without interruption. This reduces or even eliminates the downtime of the system's functionality, which translates to higher availability of the system. The previous active partition may then become the standby partition. The set of functions that are performed by the active partition and not performed by the standby partition may differ from system to system. In one embodiment, one or more warm memories of system 700 such as warm memory 729 may be used to communicate data between the partitions to facilitate a failover. Further details, related to active and standby partitions and processing performed during a failover are provided in U.S. Non-Provisional Ser. No. 12/842,936 titled ACHIEVING ULTRA-HIGH AVAILABILITY USING A SINGLE CPU, filed Jul. 23, 2010 and incorporated herein by reference for all purposes.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A system comprising:
   a processing element; and
   a volatile memory associated with the processing element, the volatile memory comprising
   a memory section for persisting data stored in the memory section across a warm boot of the system, the memory section comprising a first memory portion allocated for a subscriber and a second memory portion, the first memory portion storing reference information usable for accessing data stored by the subscriber in the second memory portion;
   the system programmed to perform a warm boot, the warm boot causing an operating system of the system to be restarted without cycling power to the system; and
   after performing the warm boot, the system further programmed to enable the subscriber to retrieve the data stored by the subscriber in the second memory portion using the reference information stored in the first memory portion.

2. The system of claim 1 wherein the processing element is a single processor, a group of processors, or a set of cores of a plurality of processors, wherein the set of cores comprises cores from one or more of the plurality of processors.

3. The system of claim 1 wherein the subscriber is an application, or a thread executed by the processing element.

4. The system of claim 1 wherein the subscriber is a device driver.

5. A network device comprising the system of claim 1.

6. The system of claim 1 wherein the system is further programmed to enable the subscriber to provide a size for the memory section that is to be allocated for the subscriber.

7. The system of claim 1 wherein the system is further programmed to enable the subscriber to use an Application Programmer Interface (API) to allocate the memory section of the volatile memory for persisting stored data across a warm boot of the system.

8. The system of claim 1 wherein the system is further programmed to enable the subscriber to allocate the first memory portion using an Application Specific Interface (API).

9. The system of claim 1 wherein the system is further programmed to enable the subscriber to allocate the second memory portion using an Application Specific Interface (API).

10. The system of claim 1 wherein after performing the warm reboot the system is programmed to initialize the memory management unit (MMU) to present the first memory portion and the second memory portion at the same virtual address as before the warm reboot.

11. The system of claim 1 wherein the system is further programmed to enable the subscriber to retrieve the data stored by the subscriber in the second memory portion using the reference information stored in the first memory portion in less than 10 msecs after the system initiates the warm boot.

12. The system of claim 1, wherein the system is further programmed to enable the subscriber to control the size of the allocation of the first memory portion using an Application Specific Interface (API).

13. The system of claim 1, wherein the system is further programmed to enable the subscriber to control the size of the allocation of the second memory portion using an Application Specific Interface (API).

14. The system of claim 1 wherein the processing element is a core cores of a multi-core processor.

15. The system of claim 1 wherein the subscriber is a process executed by the processing element.

16. The system of claim 1 wherein the subscriber is an operating system.

17. The system of claim 1 where the subscriber is a hypervisor.

18. A method comprising:
   allocating, by a subscriber, a memory section of volatile memory for persisting stored data across a warm boot, the volatile memory associated with a processing element;
   allocating, by the subscriber, a first memory portion and a second memory portion of the memory section for a subscriber;
   storing, by the subscriber, a reference to the second memory portion in the first memory portion;
   storing, by the subscriber, data in a second memory portion of the memory section; and
   retrieving, by the subscriber, the stored data from the second memory portion using the reference stored in the first memory portion, after a warm boot of the system, wherein the warm boot causes an operating system to be restarted without cycling power to the processing element.

19. The method of claim 18 wherein the processing element is a single processor, a group of processors, a core of a multi-core processor, or a set of cores of a plurality of processors, wherein the set of cores comprises cores from one or more of the plurality of processors.

20. The method of claim 18 wherein the subscriber is an application, a process, or a thread executed by the processing element.

21. The method of claim 18 wherein the subscriber is an operating system, a hypervisor, or a device driver.

22. The method of claim 18 wherein the subscriber provides a size for the memory section that is to be allocated for the subscriber.

23. The method of claim 18 wherein the subscriber uses an Application Programmer Interface (API) to allocate the memory section of the volatile memory for persisting stored data across a warm boot of the system.

* * * * *